(12) United States Patent
Okazaki

(10) Patent No.: US 7,058,276 B2
(45) Date of Patent: Jun. 6, 2006

(54) OPTICAL ELEMENT MODULE, AND APPARATUS AND METHOD FOR FIXING OPTICAL ELEMENT

(75) Inventor: Masahide Okazaki, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 11/073,721

(22) Filed: Mar. 8, 2005

(65) Prior Publication Data

US 2005/0161691 A1 Jul. 28, 2005

Related U.S. Application Data

(62) Division of application No. 10/662,526, filed on Sep. 16, 2003.

(30) Foreign Application Priority Data

Oct. 31, 2002 (JP) .......................... P2002-317140
Nov. 6, 2002 (JP) .......................... P2002-322452

(51) Int. Cl.
*G02B 6/00* (2006.01)
(52) U.S. Cl. ........................................ 385/137; 385/52
(58) Field of Classification Search ................ 385/137, 385/52
See application file for complete search history.

(56) References Cited

U.S. PATENT DOCUMENTS 5,745,624 A * 4/1998 Chan et al. ................... 385/91
6,222,579 B1 4/2001 Sousa 2004/0028348 A1 * 2/2004 Cote et al. ................... 385/88

OTHER PUBLICATIONS

Mitsuhiro Yano and Koichi Nishizawa "Optical and Electro-optical Engineering Contact" (Japan Optomechatronics Association, Dec. 12, 1996, vol. 34, No. 12 (1996), pp. 619-627 and 636-640).

Kazuhiko Kurata and Mitsuo Usui "Optronics" (Optronics Co., Ltd., Apr. 10, 1999, No. 4 (1999), pp. 129-133 and 140-149).

Renshi Sawada "Optronics" (Optronics Co., Ltd., Jul. 10, 1999, No. 7 (1999), pp. 149-155).

* cited by examiner

*Primary Examiner*—John D. Lee
*Assistant Examiner*—Rhonda S. Peace
(74) *Attorney, Agent, or Firm*—McDermott Will & Emery LLP

(57) ABSTRACT

A semiconductor laser (41) is fixed onto a base part (22) with a submount (32) and a reference optical axis (5) is determined by the semiconductor laser (41). A groove (222) having a U-shaped section is formed on a bonding part (221), and solder (31) is applied in the groove (222) and melted and a collimator lens (42) supported by a supporting arm (61) is moved to the groove (222). A light beam emitted from the semiconductor laser (41) is guided through the collimator lens (42) to an image pickup part (7), where an image representing the state of the light beam is acquired. The collimator lens (42) is positioned with respect to the reference optical axis (5) on the basis of the image and fixed onto the base part (22) out of contact therewith, with the solder interposed therebetween. This simplifies a structure of an optical element module (11) in which the collimator lens (42) is positioned with respect to the reference optical axis (5) with high accuracy.

17 Claims, 14 Drawing Sheets

OPTICAL ELEMENT MODULE, AND APPARATUS AND METHOD FOR FIXING OPTICAL ELEMENT

RELATED APPLICATION

This application is a divisional of Application Ser. No. 10/662,526 filed Sep. 16, 2003.

BACKGROUND OF THE INVENTION

1. Field of the Invention

The present invention relates to a technique for positioning an optical element and fixing the same.

2. Description of the Background Art

In an optical element module (i.e., a module comprising an optical element(s), such as a module comprising an optical fiber and an optical communication device), conventionally, in order to position a microscopic optical element with respect to a predetermined optical axis and fix the optical element (in other words, for alignment, to adjust the position and orientation of the microscopic optical element), the optical element is moved in one or two directions and positioned, being in contact with a contact surface(s) of a holding member, and then fixed by filling its surrounding with solder or a bonding agent (e.g., a bonding agent containing UV curing resin), or by laser fusion bonding with emission of high-energy pulsed light such as YAG laser or glass fusion bonding with glass powder.

For example, since a semiconductor laser used in a light source or the like has a large divergence angle of an emitted light beam (e.g., several tens degrees), in general, the light beam is changed into a parallel ray by using combination of collimator lenses. Specifically, as shown in FIG. 1, a holding member 92 to which a semiconductor laser 91 is fixed is provided with a contact surface 92a and an adjustment assisting member 94 on which a collimator lens 93 is fixed is inserted in the holding member 92, being in contact with the contact surface 92a. Then, the adjustment assisting member 94 is moved in a direction indicated by the arrow 95 of FIG. 1 to perform a collimating adjustment for adjusting the degree of parallelization of the light beam, and the adjustment assisting member 94 and the holding member 92 are fixed to each other.

In a multichannel optical fiber connector which is used in applications using optical fibers, such as optical fiber communications, (which is used, for example, in multichannel transmission to increase transmission capacity) and a light source unit such as a laser scan type image output apparatus and the like, a plurality of optical fibers are one-dimensionally or two-dimensionally arranged with high accuracy. In order to arrange the optical fibers, grooves 96 each having a V-shaped section are formed in such an arrangement as shown in FIG. 2 with a diamond cutter or the like in a holding member 97 formed of ceramics. Each optical fiber 98 is positioned, being in contact with side surfaces 96a of the groove 96, and then fixed.

FIG. 3 shows positioning and fixing of a bare chip 191 of semiconductor laser (hereinafter, referred to as a "semiconductor laser") and an optical fiber 192. Also in this case, the optical fiber 192 is positioned relatively to a holding member 193 on which a groove 193a having a V-shaped section is formed, by bringing a tip portion of the optical fiber 192 into contact with side surfaces of the groove 193a. The semiconductor laser 191 supported by a collet (not shown) is positioned with respect to the optical fiber 192, being in contact with an upper surface of the holding member 193, and fixed by a bonding agent (such as solder).

In a case of coupling (or splice) as shown in FIG. 4 where an optical waveguide element 194 and a plurality of optical fibers 192 are positioned and fixed to each other, the optical waveguide element 194 is positioned relatively to the holding member 195 and fixed thereto. On a positioning member 196 on which a plurality of grooves 196a each having a V-shaped section are formed and a positioning member 197 on which a groove 197a also having the V-shaped section, a plurality of optical fibers 192 are fixed with a bonding agent or the like, being in contact with respective side surfaces of the grooves 196a and 197a, and the positioning members 196 and 197 are fixed onto the holding member 195, to position the optical fibers 192 with respect to the optical waveguide element 194.

There is relevant technique which is shown in the following document.

"Optical and Electro-optical Engineering Contact" (Japan Optomechatronics Association, Dec. 20, 1996, Vol. 34, No. 12 (1996), p.p. 619–627 and 636–640).

"OPTRONICS" (Optronics Co., Ltd., Apr. 10, 1999, No. 4 (1999), p.p. 129–133 and 140–149).

"OPTRONICS" (Optronics Co., Ltd., Jul. 10, 1999, No. 7 (1999), p.p. 149–155).

In the exemplary case of FIG. 1, since the collimator lens 93 can be moved only in the direction indicated by the arrow 95 and the position and orientation thereof with respect to other directions depend on processing accuracy or the like of the members, it is difficult to perform an adjustment even in a case where a fine adjustment is needed, such as, where an emission angle of the light beam from the semiconductor laser 91 slightly deviates. If it is intended to increase the degree of freedom in adjustment, the structure becomes complicated and this causes a problem of increasing a manufacturing cost and the like.

In the exemplary case of FIG. 2, though ceramics which is less affected by temperature change or the like is generally used as the holding member 97, the ceramics is a costly material and needs a high machining cost. Further, with this method, it is difficult to deal a complicated arrangement.

In the optical element module of FIG. 3, though the optical fiber 192 can be adjusted to a predetermined position only in the Z direction, the position and orientation with respect to other directions depend on the shape of the groove 193a. Though the semiconductor laser 191 can be positioned with respect to the optical fiber 192 by moving it in the X and Z directions, the position thereof in the Y direction can not be determined freely. As a result, while it is possible to ensure high relative positioning accuracy of 1 to 2 μm in the X and Z directions, the relative positioning accuracy in the Y direction becomes worse (e.g., several μm) than that in the X and Z directions since it depends on the machining accuracy of the groove 193a and the reproducibility in thickness of the bonding agent.

In the optical element module of FIG. 4, while it is possible to ensure the positioning accuracy of about 0.2 μm with respect to the optical waveguide element 194 in the X and Z directions by applying a bonding agent or the like between the positioning members 196 and 197 and the holding member 195 and adjusting the bonding position, the positioning accuracy in the Y direction is about 1 μm due to variations in machining accuracy of the grooves 196a and 197a and diameter of the optical fibers 192, and the like.

SUMMARY OF THE INVENTION

It is an object of the present invention to simplify a structure of an optical element module in which an optical element is positioned with high accuracy. It is another object of the present invention to position and fix the optical element with high accuracy.

The present invention is intended for an optical element module. According to the present invention, the optical element module comprises a base part to which a predetermined reference optical axis is relatively fixed, an optical element positioned with respect to the reference optical axis, being out of contact with the base part, and solder interposed between the optical element and the base part, for fixing the optical element onto the base part.

Since the optical element is positioned and fixed onto the base part out of contact therewith, a structure of the optical element module is simplified.

According to a preferred embodiment of the present invention, the base part is a part which is fixed to another optical element which determines the reference optical axis. Among the optical elements requiring high-accuracy positioning are a collimator lens, a semiconductor light emitting element, an optical waveguide element, an optical fiber and the like.

The present invention is also intended for an apparatus for fixing an optical element onto a base part. According to the present invention, the apparatus comprises a holding part for holding a base part to which a bonding agent for fixing a first optical element is applied, a supporting part which supports the first optical element while moving the same to the base part and is removed from the first optical element after fixing, a light receiving part for receiving a reference light emitted from the first optical element or a second optical element attached onto at the base part, a mechanism for moving or rotating the supporting part relatively to the holding part, and a control part for positioning the first optical element at a position with respect to the second optical element on the basis of an output from the light receiving part.

By using the output from the light receiving part, it is possible to position and fix the optical element onto the base part with high accuracy.

Preferably, the control part controls a position of the first optical element in the course of hardening of the bonding agent.

Still preferably, the apparatus further comprises a switching lens which is movable to and fro on an optical path, between the light receiving part and a front optical element that is one of the first and second optical elements which is closer to the light receiving part, and in the apparatus, the front optical element is a lens and the front optical element and a light receiving surface in the light receiving part are optically conjugate to each other in a state where the switching lens is disposed on the optical path. This allows positioning of the optical element on the basis of the state of light immediately after being emitted from the front optical element.

According to one preferred embodiment of the present invention, a moving or rotating mechanism moves or rotates the supporting part relatively to the holding part with respect to at least three axes. It is thereby possible to freely position the optical element.

As a bonding agent for fixing the optical element with high accuracy, preferably, glass powder or solder is used.

In this apparatus, positioning of the first optical element is not necessarily performed with respect to the second optical element, but there may be a case where the light receiving part receives a reference light emitted from the optical element and positioning of the light receiving element is thereby performed.

The present invention is further intended for a method of fixing an optical element onto a base part.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
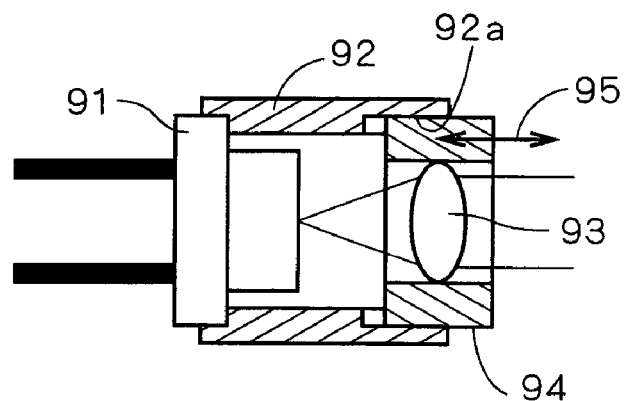
FIG. 1 is a cross section illustrating a background-art optical element module.
Figure 2:
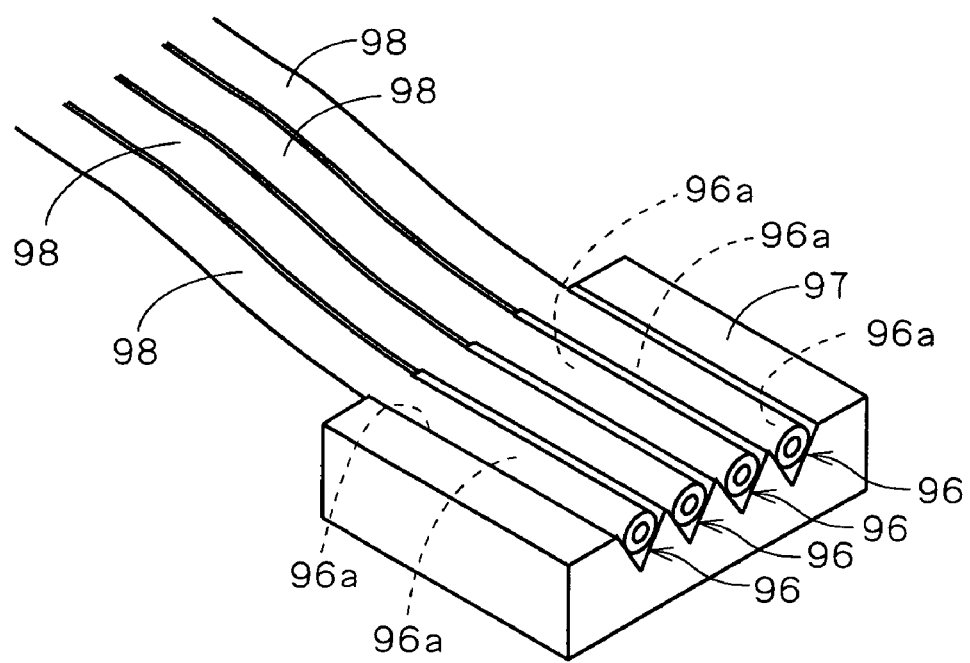
FIG. 2 is a perspective view illustrating another background-art optical element module.
Figure 3:
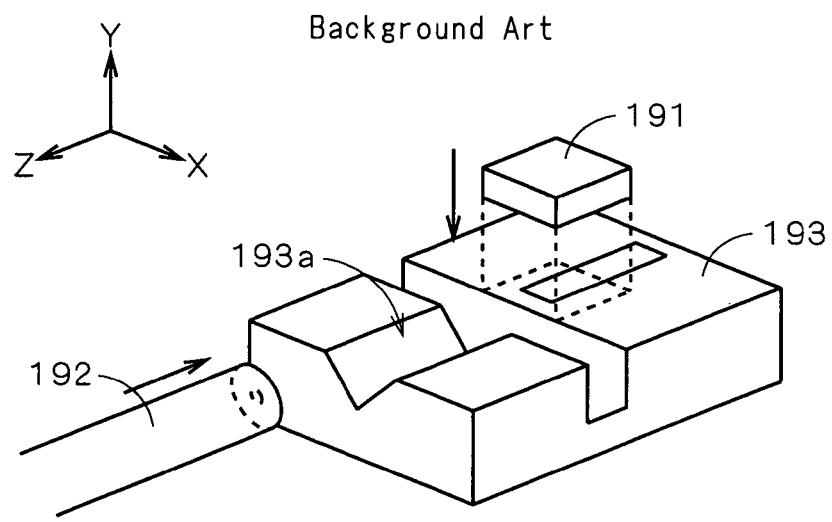
FIG. 3 is a view showing manufacture of still another background-art optical element module.
Figure 4:
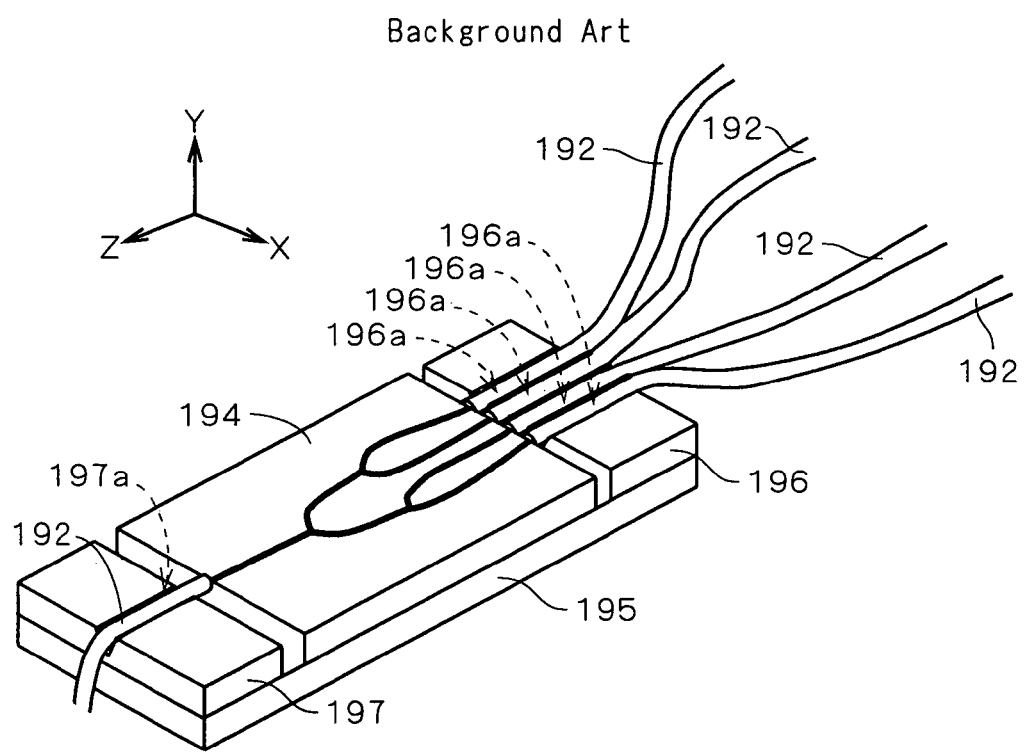
FIG. 4 is a perspective view showing yet another background-art optical element module.
Figure 5:
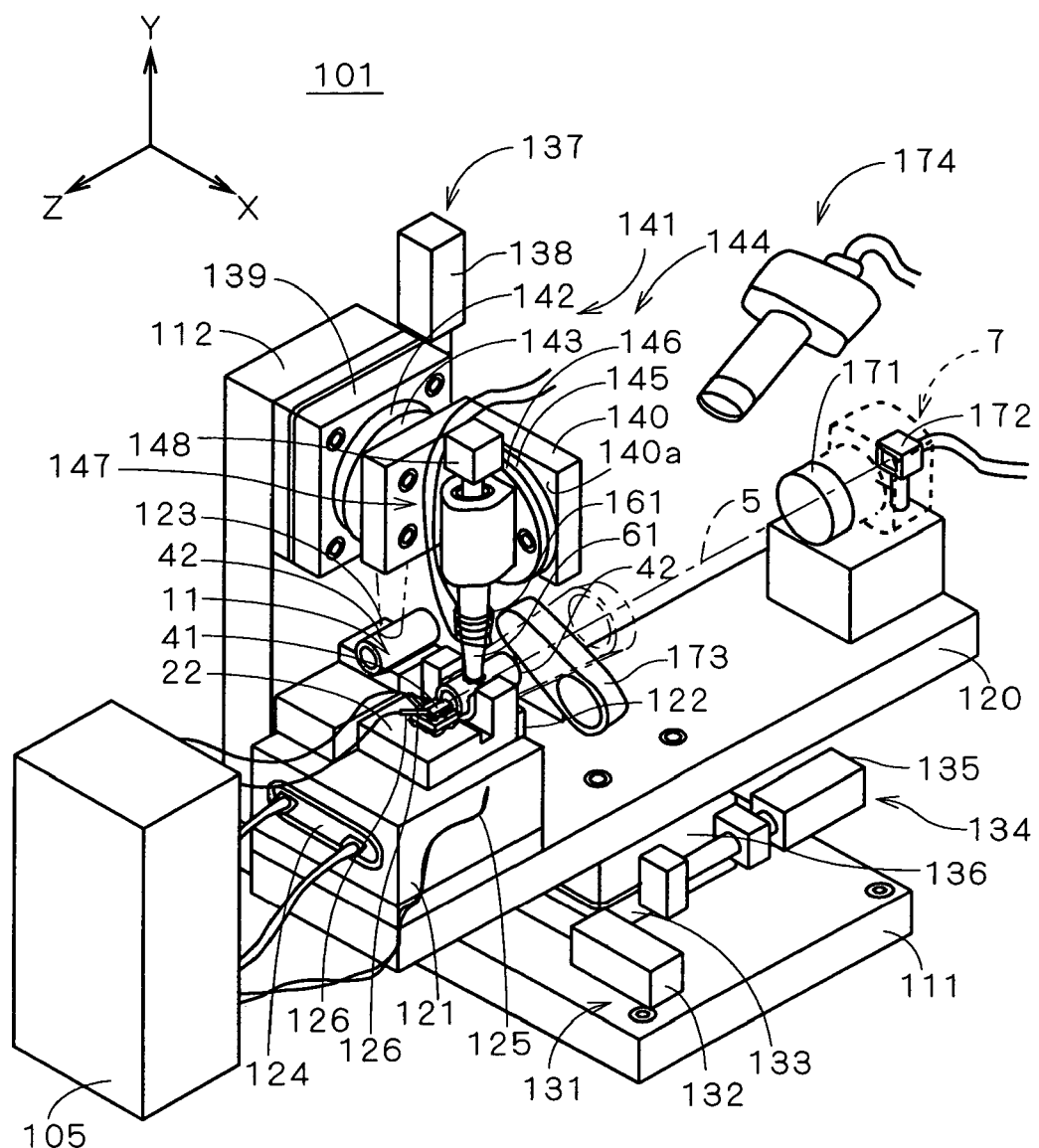
FIG. 5 is a perspective view showing an optical element fixing apparatus in accordance with a first preferred embodiment.

FIG. 5 is a perspective view showing an optical element fixing apparatus 101 in accordance with the first preferred embodiment of the present invention. The optical element fixing apparatus 101 of FIG. 5 is an apparatus for positioning and fixing a collimator lens 42 (e.g., a SELFOC microlens (SELFOC: registered trademark) or an aspherical press lens having a diameter of about 1 mm) to a base part 22 to which a semiconductor laser 41 for emitting a light beam is fixed. With this optical element fixing apparatus 101, an optical element module (hereinafter, referred to as "semiconductor laser module") 11 for emitting the light beam as a parallel ray is manufactured. The optical element fixing apparatus 101 comprises a holding part 121 for holding the base part 22, a supporting arm 61 for supporting the collimator lens 42 and a control unit 105 constituted of a CPU for various computations, memories for storing various information and the like.

The holding part 121 is provided on a plate 120 extending in the Z direction of FIG. 5. On an upper surface of the holding part 121, a base part assisting member 122 used for positioning the base part 22 protruding in the (+Y) direction and a collimator lens assisting member 123 on which a groove having a V-shaped section is formed are provided. On the collimator lens assisting member 123, the collimator lens 42 before assembling is disposed, being in contact with side surfaces of the groove. The holding part 121 is further provided with a holding part heater 124 for heating the holding part 121, a temperature sensor 125 for sensing the surface temperature of the holding part 121 and probe pins 126 (having an anode terminal and a cathode terminal) connected to the semiconductor laser 41, and the holding part heater 124, the temperature sensor 125 and the probe pin 126 are connected to the control unit 105.

The supporting arm 61 is provided with an arm heater 161 connected to the control unit 105, and the surface temperature of the supporting arm 61 is controlled by the arm heater 161. The supporting arm 61 is supported by later-discussed moving mechanisms to be movable in the Y direction and rotatable around rotation axes parallel to the X axis, the Y axis and the Z axis (hereinafter, referred to as $\alpha$ axis, $\beta$ axis and $\gamma$ axis, respectively), The optical element fixing apparatus 101 has an X-direction moving mechanism 131 for moving the holding part 121 in the X direction of FIG. 5 and a Z-direction moving mechanism 134 for moving the holding part 121 in the Z direction. The X-direction moving mechanism 131 provided on a base 111 has an X stage 133 on which an X-direction adjusting mechanism 132 having a micrometer is fixed, and the X-direction adjusting mechanism 132 is controlled to move the X stage 133 in the X direction along guide rails (not shown) provided between the base 111 and the stage 133. The Z-direction moving mechanism 134 has the same constitution and a Z-direction adjusting mechanism 135 having a micrometer is controlled to move a Z stage 136 fixed onto the plate 120 in the Z direction. The X-direction moving mechanism 131 and the Z-direction moving mechanism 134 are connected to the control unit 105.

The optical element fixing apparatus 101 further has a Y-direction moving mechanism 137 for moving the supporting arm 61 in the Y direction, an $\alpha$ rotation mechanism 141 rotating around the $\alpha$ axis, a $\gamma$ rotation mechanism 144 rotating around the $\gamma$ axis and a $\beta$ rotation mechanism 147 rotating around the $\beta$ axis. The Y-direction moving mechanism 137 is attached onto a plate 112 provided on the base 111 and has a Y stage 139 on which a Y-direction adjusting mechanism 138 having a micrometer is fixed. The Y-direction adjusting mechanism 138 is controlled to move the Y stage 139 in the Y direction.

A reduction gear motor 142 of the $\alpha$ rotation mechanism 141 is attached onto the Y stage 139 and the reduction gear motor 142 is controlled to rotate a $\alpha$ table 143 around the $\alpha$ axis. On the $\alpha$ table 143, an L-shaped member 140 is fixed. The L-shaped member 140 has a surface 140$a$ protruding in the X direction and having a normal parallel to the Z axis, and the $\gamma$ rotation mechanism 144 is attached onto the surface 140$a$. The $\gamma$ rotation mechanism 144 has the same constitution as the $\alpha$ rotation mechanism 141, and a $\gamma$ table 146 is rotated by a reduction gear motor 145 around the $\gamma$ axis. A $\beta$ rotation mechanism 147 supporting the supporting arm 61 rotatably around the $\beta$ axis is provided on the $\gamma$ table 146, and the supporting arm 61 is rotated around the $\beta$ axis by a reduction gear motor 148 of the $\beta$ rotation mechanism 147. The Y-direction moving mechanism 137, the rotation mechanisms 141, 144 and 147 are connected to the control unit 105.

The optical element fixing apparatus 101 further has an image pickup part 7 (e.g., a CCD camera) receiving the light beam from the semiconductor laser 41 connected to the probe pins 126, which is provided on the plate 120, being opposed to the holding part 121. The image pickup part 7 has a sensing lens 171 and an image pickup device 172, and the light beam from the semiconductor laser 41 are received by the image pickup device 172 through the sensing lens 171. A switching lens 173 is further provided on the plate 120, being movable to and fro on an optical path of the light beam between the image pickup part 7 and the collimator lens 42. In the state where the switching lens 173 is disposed on the optical path, the collimator lens 42 and the image pickup device 172 (exactly, a light receiving surface of the image pickup device 172) are made optically conjugate to each other by the switching lens 173 and the sensing lens 171. An auxiliary image pickup part 174 having a microlens is provided over the image pickup part 7 and picks up an image of the neighborhood of the collimator lens 42 on the base part 22.

Figure 6:
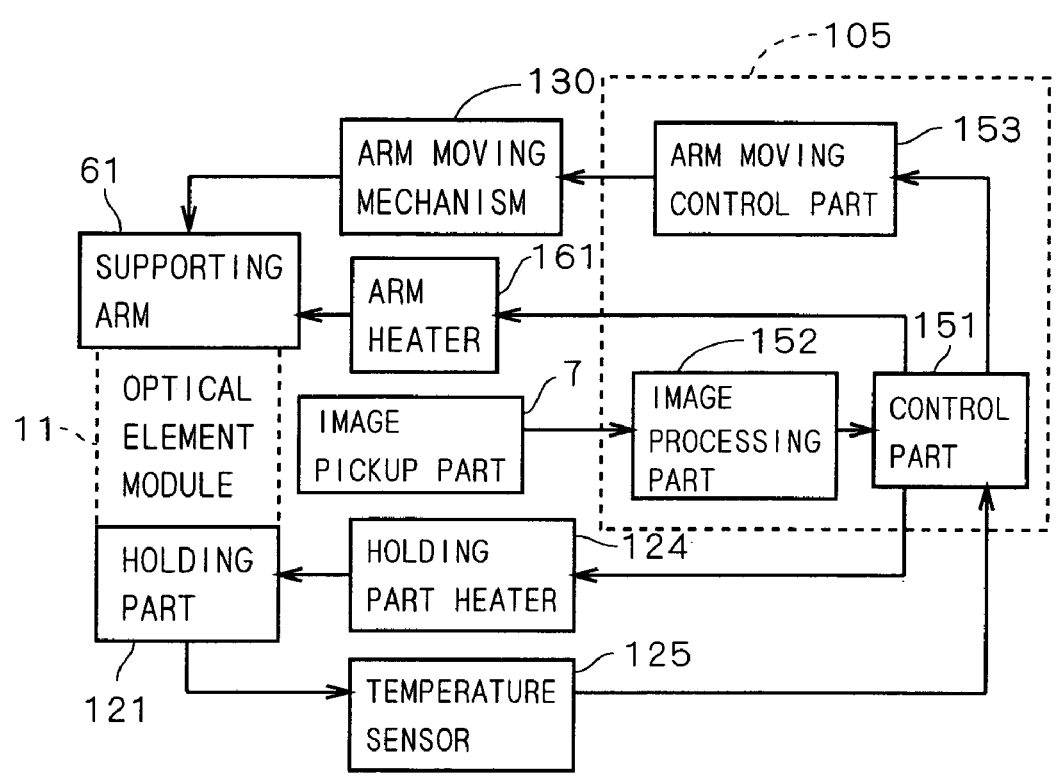
FIG. 6 is a block diagram showing a constitution of the optical element fixing apparatus.

FIG. 6 is a block diagram showing a constitution of the optical element fixing apparatus 101, and a control part 151, an image processing part 152 and an arm moving control part 153 are contained in the control unit 105 of FIG. 5. The image processing part 152 performs various processing on image data from the image pickup part 7 and outputs a signal to the control part 151. The arm moving control part 153 controls the moving mechanisms 131, 134 and 137 and the rotation mechanisms 141, 144 and 147 (hereinafter, referred to generally as an "arm moving mechanism 130") on the basis of the signal from the control part 151, and the supporting arm 61 thereby moves relatively to the holding part 121 along the three motion axes (i.e., the X axis, the Y axis and the Z axis) which are orthogonal to one another and rotates relatively to the holding part 121 around the three rotation axes (i.e., the $\alpha$ axis, the $\beta$ axis and the $\gamma$ axis) which are orthogonal to one another. In the optical element fixing apparatus 101, the control part 151 further controls the other constituent elements, to manufacture an optical element module.

Figure 7A:
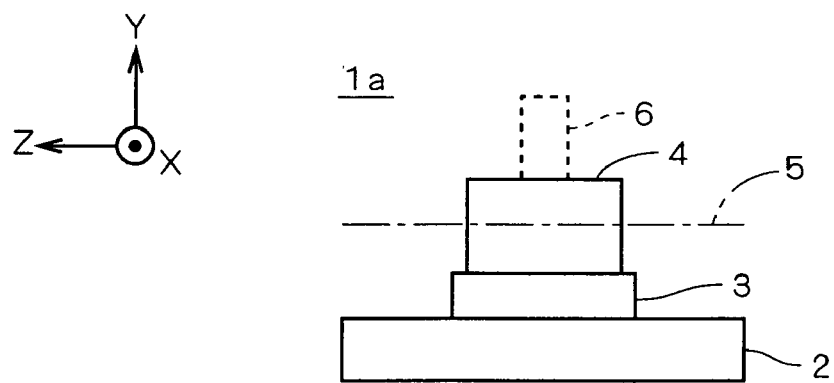
FIGS. 7A to 7C are views showing basic structures of optical element modules.
Figure 7B:
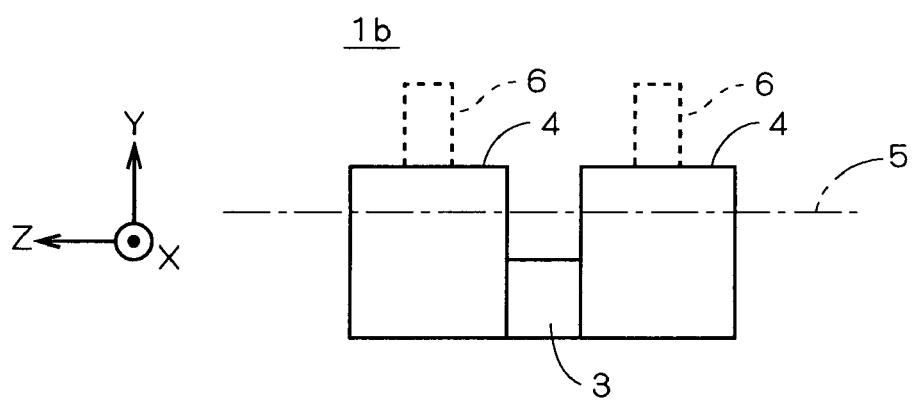
Figure 7C:
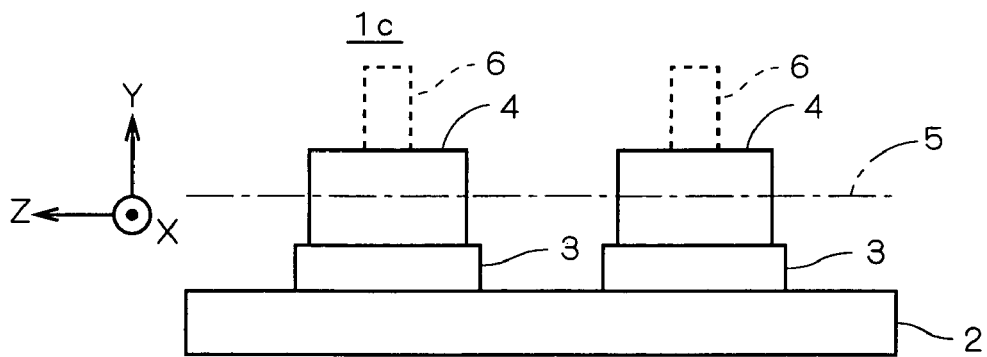

Herein, discussion will be made on a basic structure of the optical element module manufactured by the optical element fixing apparatus 101. FIGS. 7A to 7C are views showing the basic structures of optical element modules. In an optical element module 1$a$ in accordance with a first basic structure shown in FIG. 7A, above a base part 2 on which a predetermined optical axis 5 (i.e., an axis used as a reference for positioning of the optical element, and hereinafter, referred to as a "reference optical axis 5") is relatively fixed, an optical element 4 is disposed, which is positioned with respect to the reference optical axis 5. Solder 3 is interposed between the base part 2 and the optical element 4, and the optical element 4 is fixed on the base part 2 out of contact therewith. When the optical element 4 is positioned, the optical element 4 is supported by a supporting part 6 (which corresponds to the supporting arm 61), being movable along the three-axis directions (i.e., the X axis direction, the Y axis direction and the Z axis direction of FIG. 7A) which are orthogonal to one another and rotatable around the rotation axes (i.e., the α axis, the β axis and the γ axis) which are parallel to the three axes, respectively. This allows the optical element 4 to be positioned with respect to the reference optical axis 5.

In an optical element module 1*b* in accordance with a second basic structure shown in FIG. 7B, with respect to the reference optical axis 5 which is relatively fixed to one of two optical elements 4 (in other words, determined by one optical element 4), the other optical element 4 is positioned and the two optical elements 4 are fixed out of contact with each other with the solder 3 interposed therebetween. In an optical element module 1*c* in accordance with a third basic structure shown in FIG. 7C, above the base part 2 on which the reference optical axis 5 is relatively fixed, a plurality of optical elements 4 are disposed, which are individually positioned with respect to the reference optical axis 5, and the optical elements 4 are fixed onto the base part 2 out of contact therewith, with the solder 3 interposed therebetween. When the optical element modules 1*a*, 1*b* and 1*c* are manufactured, the optical elements 4 are positioned by the supporting part 6 having flexibility with respect to the six axes.

In the second basic structure, the reference optical axis 5 is determined by one optical element 4, which serves as a reference for positioning of the other optical element 4, and if part of the one optical element 4 is considered to correspond to the base part 2 in the first basic structure, the second basic structure can be regarded as an application of the first basic structure. In the third basic structure, if relatively to the base part 2 on which one optical element 4 determining the reference optical axis 5 is fixed, the other optical element 4 is considered to be positioned, the third basic structure can be also regarded as an application of the first basic structure.

Figure 8:
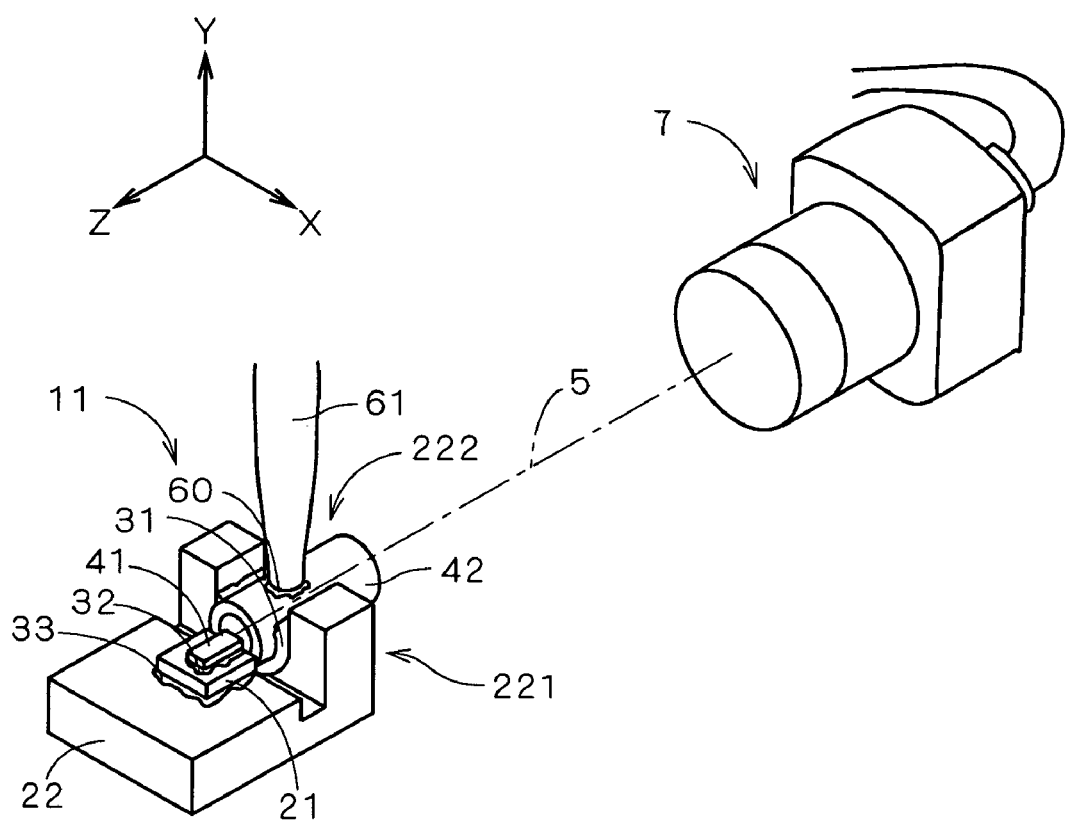
FIG. 8 is a view showing an exemplary manufacture of the optical element module.
Figure 9:
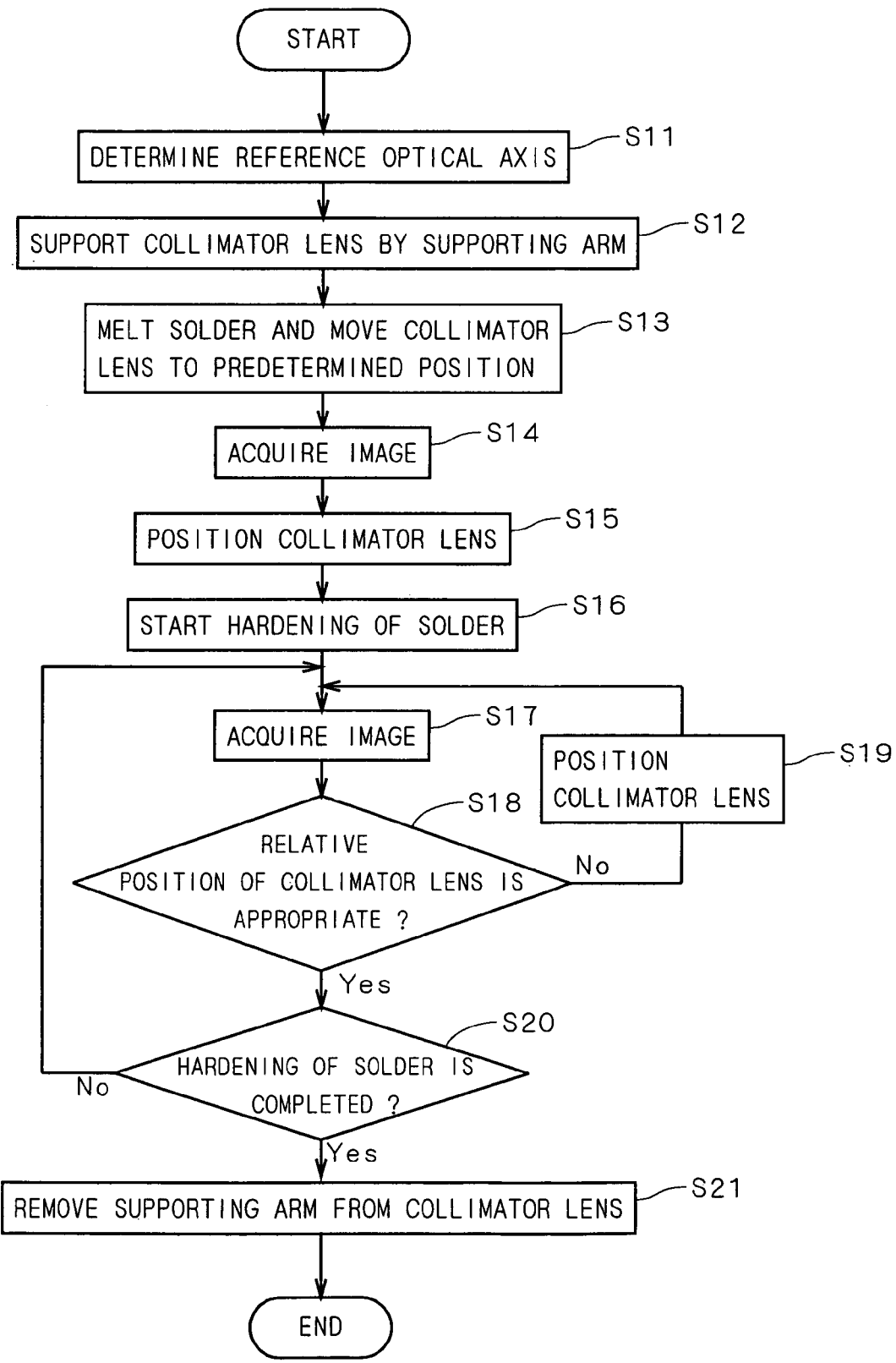
FIG. 9 is a flowchart showing a process flow of manufacturing the optical element module.

FIG. 8 is a view showing an exemplary manufacture of the semiconductor laser module 11 by the optical element fixing apparatus 101 (where only part of members on the holding part 121, the supporting arm 61 and the image pickup part 7 are shown), and FIG. 9 is a flowchart showing a process flow of manufacturing the semiconductor laser module 11. Discussion will be made on a manufacturing process and a structure of the semiconductor laser module 11 according to the flow of FIG. 9, referring to FIGS. 5, 6 and 8.

The base part 22 is provided with a bonding part 221 protruding in the (+Y) direction of FIG. 8, and a groove 222 having a U-shaped section is formed on the bonding part 221. The semiconductor laser 41 for emitting the light beam is fixed onto a plate-like submount 21 with solder 32 interposed therebetween in advance, and the submount 21 is fixed onto the base part 22 with solder 33 (preferably, whose melting point is lower than that of the solder 32) interposed therebetween. At this time, the submount 21 and the semiconductor laser 41 are disposed so that a surface of the semiconductor laser 41 which emits the light beam should be opposed to the bonding part 221. By providing the semiconductor laser 41, the reference optical axis 5 corresponding to the light beam emitted from the semiconductor laser 41 is determined with respect to the base part 22 (Step S11).

The base part 22 on which the semiconductor laser 41 is fixed is disposed on the holding part 121 so that a side surface of the base part 22 on the side of the bonding part 221 should come into contact with the base part assisting member 122 (see FIG. 5) and positioned relatively to the holding part 121. The reference surface on which the base part 22 is positioned may be appropriately changed as necessary, and there may be a case, for example, where a member in contact with a side surface which is orthogonal to the side surface of the base part 22 on the side of the bonding part 221 is provided on the holding part 121 and the base part 22 is positioned by this member and an upper surface of the holding part 121 (and the base part assisting member 122). In other words, in the optical element fixing apparatus 101, the base part 22 has only to be disposed on the holding part 121 with a certain surface as the reference surface.

Subsequently, the collimator lens 42 on the collimator lens assisting member 123 is supported by the supporting arm 61 with solder 60 interposed therebetween (Step S112). Specifically, under control of the control part 151, the supporting arm 61 is moved by the arm moving mechanism 130 to a position above the collimator lens 42 disposed on the collimator lens assisting member 123 while being heated by the arm heater 161, and the solder 60 is applied to a tip portion of the supporting arm 61. The tip portion of the supporting arm 61 and the collimator lens 42 come into contact with each other and heating by the arm heater 161 is stopped. Though the collimator lens 42 is formed of glass, a metal such as gold is evaporated (metallized) on its outer peripheral surface in advance in order to fix the collimator lens 42 to the tip portion of the supporting arm 61 with the solder 60 interposed therebetween. This allows the supporting arm 61 to easily support the collimator lens 42. Since the collimator lens 42 is disposed along the groove of the collimator lens assisting member 123, the collimator lens 42 can be supported by the supporting arm 61 at a predetermined orientation.

Powdered solder 31 (such as ball solder and cream solder) is applied (or was applied in advance) to the groove 222 of the bonding part 221. As the solder 31, one whose melting point is lower than those of the solders 32, 33 and 60 (for example, 140 degrees) is used, and the base part 22 is heated by the holding part heater 124 up to the melting point of the solder 31 with the holding part 121 interposed therebetween.

Figure 10:
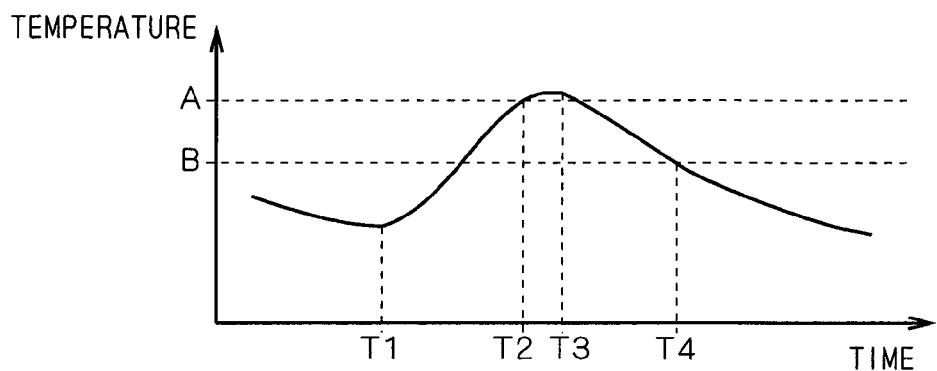
FIG. 10 is a graph showing a temperature profile of a holding part.

FIG. 10 is a graph showing a relation between temperature of the holding part 121 which is sensed by the temperature sensor 125 and time (i.e., a temperature profile). In FIG. 10, time T1 indicates the time when heating of the holding part heater 124 is started and the temperature of the holding part 121 at time T2 becomes a temperature A where the solder 31 is melted. After the temperature of the holding part 121 rises to A, the temperature of the holding part 121 is kept at A (or slightly higher temperature than A) by the holding part heater 124. Melting of the solder 31 is picked up by the auxiliary image pickup part 174 as an image and checked by the acquired image. When the solder 31 is melted, the collimator lens 42 is transferred to the groove 222 by the supporting arm 61 (Step S13).

A semiconductor laser driving part (not shown) contained in the control unit 105 is electrically connected to the semiconductor laser 41 through the probe pins 126 and controls the semiconductor laser 41 to emit the light beam towards the collimator lens 42 (in other words, in the (−Z) direction of FIG. 8). The light beam is guided to the image pickup part 7 positioned on the (−Z) side of the base part 22 through the collimator lens 42. The image pickup part 7 acquires an image representing the state of the light beam led out from the collimator lens 42 (Step S14) and outputs the image to the image processing part 152 (see FIG. 6). The image processing part 152 appropriately processes the acquired image and outputs the processed image to the control part 151. The control part 151 outputs a control signal on the basis of the processed image to the arm moving control part 153, by which the supporting arm 61 moves the collimator lens 42 in the X axis, Y axis and Z axis directions and rotates the collimator lens 42 around the α axis, the β axis and the γ axis to perform an adjustment of the position and orientation of the collimator lens 42 (i.e., active alignment) with respect to the semiconductor laser 41 (in other words, so that the light beam should go along the reference optical axis 5) (Step S15).

Figure 11A:
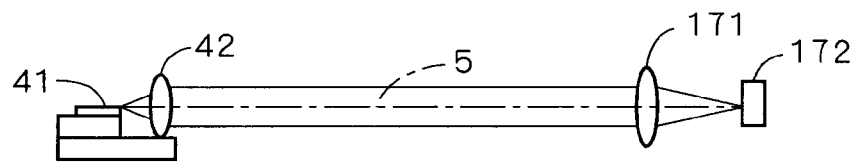
FIGS. 11A to 11D are views showing states of positioning of a collimator lens.

FIGS. 11A to 11D are views showing states of positioning of the collimator lens 42. FIG. 11A shows a state where the collimator lens 42 is appropriately positioned. In FIG. 11A, the light beam from the collimator lens 42 is changed into a parallel ray which are parallel to the reference optical axis 5 (in other words, with high degree of parallelization (collimating accuracy)), and the light beam form a small spot on the image pickup device 172 through the sensing lens 171 (in other words, the size of a bright region in the acquired image is small). Since the light beam is emitted to a predetermined position of the image pickup device 172, it is confirmed that the directivity of the light beam is good.

Figure 11B:
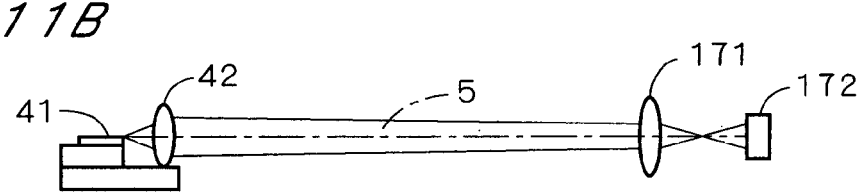
Figure 11C:
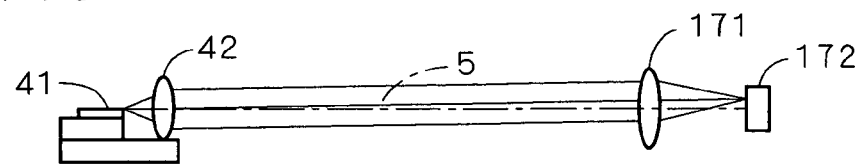

In a state of FIG. 11B, as the collimating accuracy of the light beam is not sufficiently adjusted, a large spot is formed on the image pickup device 172 and the bright region in the acquired image is blurred. In a state of FIG. 11 C, the position or orientation of the collimator lens 42 is not appropriate and the direction of the light beam deviates from the reference optical axis 5, and the light beam can not be emitted to the predetermined position on the image pickup device 172.

Figure 11D:
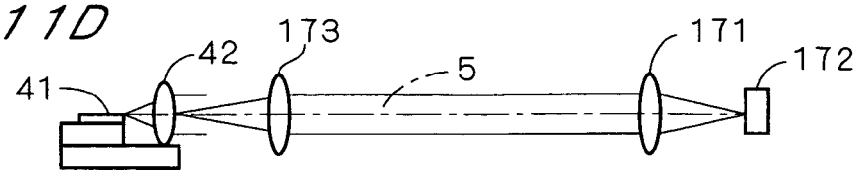

In a case where the semiconductor laser module 11 is used in a light source of an image recording apparatus and the like, since the light beam just emitted from the collimator lens 42 is used (i.e., the shape of the light beam at the collimator lens 42 is projected on the object), a fine adjustment on the position and orientation of the collimator lens 42 is performed with the switching lens 173 disposed on the optical path of the light beam, as shown in FIG. 11D, besides the above-discussed adjustment on collimating accuracy and directivity of the light beam. Specifically, an image representing a state of the light beam immediately after being led out from the collimator lens 42 is acquired and the collimator lens 42 is positioned on the basis of the image (in other words, the sectional shape of the light beam immediately after being led out). Steps S14 and S15 are repeated as necessary.

Figure 12:
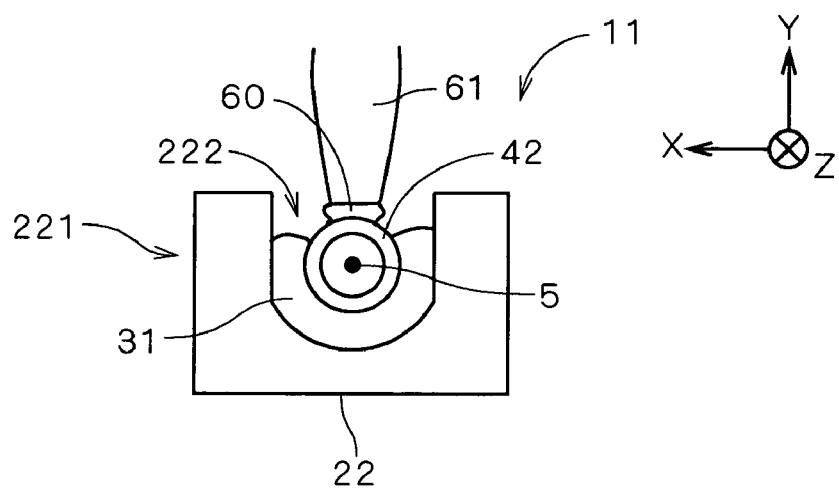
FIG. 12 is a view showing manufacture of the optical element module.

FIG. 12 is a view showing the semiconductor laser module 11 in course of manufacture as viewed from the (-Z) side towards the (+Z) direction. As shown in FIG. 12, the collimator lens 42 which is positioned with high accuracy (e.g., with an accuracy of 0.1 to 0.2 μm with respect to the reference optical axis 5) is out of contact with the base part 22 and the solder 31 is entirely interposed between the collimator lens 42 and the base part 22. This state can be confirmed with the image acquired by the auxiliary image pickup part 174. After the collimator lens 42 is positioned, the heating by the holding part heater 124 is subsequently stopped (at time T3 of FIG. 10) and the solder 31 is naturally cooled and starts to be hardened (Step S16).

When the temperatures of the members are lowered, though the relative position of the collimator lens 42 with respect to the reference optical axis 5 is moved by shrinkage of these members, also in course of hardening of the solder 31, the image pickup part 7 acquires the image of the light beam led out from the collimator lens 42 (Step S17) and checks the position of the collimator lens 42 (Step S18), and the control part 151 positions the collimator lens 42 following the relative move of the reference optical axis 5 (Step S19). Steps S17 to S19 are repeated until the hardening of the solder 31 is completed (Step S20), and this keeps the relative position and orientation of the collimator lens 42 with respect to the reference optical axis 5 (in other words, the collimator lens 42 is positioned so that the image acquired by the image pickup part 7 should almost keep the state immediately before the hardening of the solder 31 starts).

After the solder 31 is hardened (at time T4 of FIG. 10), the image acquired by the image pickup part 7 keeps a constant state and the temperature sensor 125 confirms that the temperature of the holding part 121 is not higher than a predetermined temperature (the temperature B of FIG. 10 (e.g., a temperature lower than the temperature A by several tens degrees)). After that, the supporting arm 61 is heated by the arm heater 161, the solder 60 is melted and the supporting arm 61 is removed from the collimator lens 42 (Step S21), to complete the semiconductor laser module 11.

Thus, in the optical element fixing apparatus 101, the collimator lens 42 can be positioned with respect to the reference optical axis 5 with high accuracy and fixed with solder 31 onto the base part 22 which is fixed to the semiconductor laser 41, being out of contact with the base part 22. As a result, the optical element fixing apparatus 101 can manufacture the semiconductor laser module 11 which emits an appropriate light beam with high directivity and collimating accuracy, and the structure of the semiconductor laser module 11 can be simplified (and size-downed).

In the optical element fixing apparatus 101, since the orientation of the collimator lens 42 is adjusted by the collimator lens assisting member 123 in advance, the supporting arm 61 moves with respect to at least three axes (herein, the X axis, the Y axis and the Z axis) relatively to the holding part 121 to thereby temporarily position the collimator lens 42 with high accuracy. Even if the orientation of the collimator lens 42 changes when the collimator lens 42 is supported by the supporting arm 61, the supporting arm 61 relatively moves along the three motion axes (i.e., the X axis, the Y axis and the Z axis) and relatively rotates around the three rotation axes (i.e., the α axis, the β axis and the γ axis) to thereby position the collimator lens 42 onto the base part 22 out of contact therewith, with high accuracy.

The semiconductor laser module 11 corresponds to the optical element module 1a in accordance with the first basic structure among the three basic structures shown in FIGS. 7A to 7C. Specifically, the collimator lens 42 is positioned with respect to the reference optical axis 5 fixed onto the base part 22 by fixing the semiconductor laser 41. The semiconductor laser 41 (or the submount 21 to which the semiconductor laser 41 is fixed) may be positioned with respect to a reference optical axis which is assumed relatively to the base part 22 and fixed onto the base part 22 out of contact therewith with the solder interposed therebetween, and in this case, the semiconductor laser module corresponds to the optical element module 1c in accordance with the third basic structure of FIG. 7C.

Figure 13:
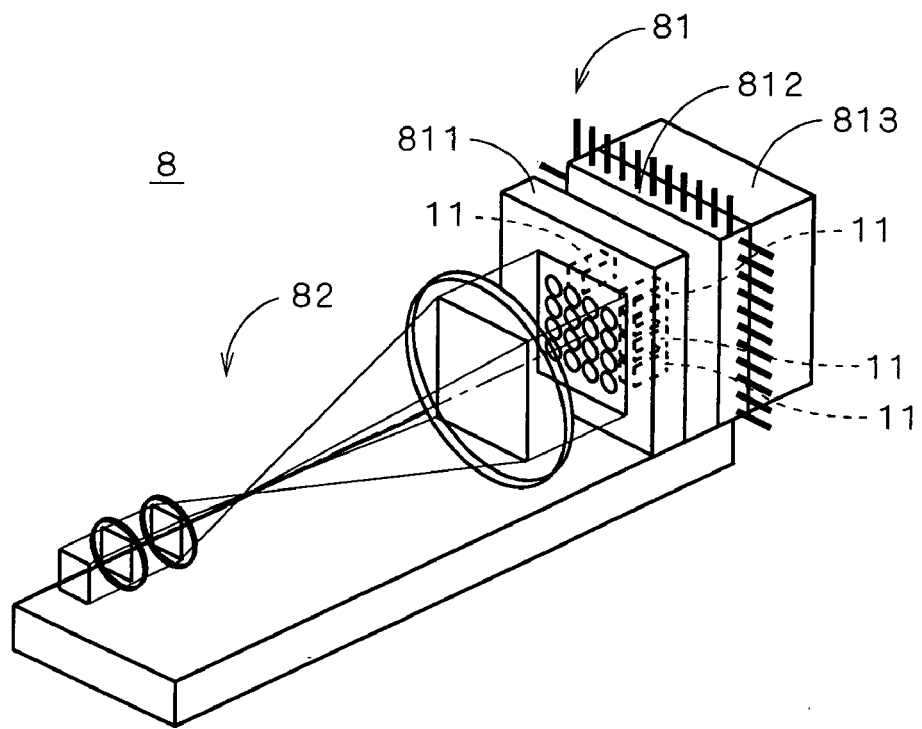
FIG. 13 is a perspective view showing an optical head.

FIG. 13 is a perspective view showing an optical head 8 using the above-described semiconductor laser modules 11. The optical head 8 has a multichannel light source unit 81, and the light beams from the light source unit 81 are emitted to an exposure region where a photosensitive material or the like are positioned, through a group of lenses 82 which are constituents of a both-side telecentric optical system. The light source unit 81 has a module supporting part 811 for supporting the semiconductor laser modules 11, a semiconductor laser driving control part 812 for controlling drive of the semiconductor laser modules 11 and a temperature control part 813 for controlling the temperature of the semiconductor laser modules 11, and the semiconductor laser modules 11 are inserted into a plurality of holes formed on the module supporting part 811 in a two-dimensional arrangement.

In this case, since the semiconductor laser module 11 is adjusted with a side surface of the base part 22 on the side of the bonding part 221 as a reference surface (in other words, the collimator lens 42 is positioned), the side surface comes into contact with a surface of the module supporting part 811 to thereby achieve an accurate positioning in the optical head 8.

By using the semiconductor laser modules 11, a small-sized optical head 8 capable of emitting multichannel light beams appropriately (for example, with a constant directivity) is achieved, and it is thereby possible to perform size-reduction of an image recording apparatus (such as raster scan type image recording apparatus) and high-accuracy drawing.

Figure 14:
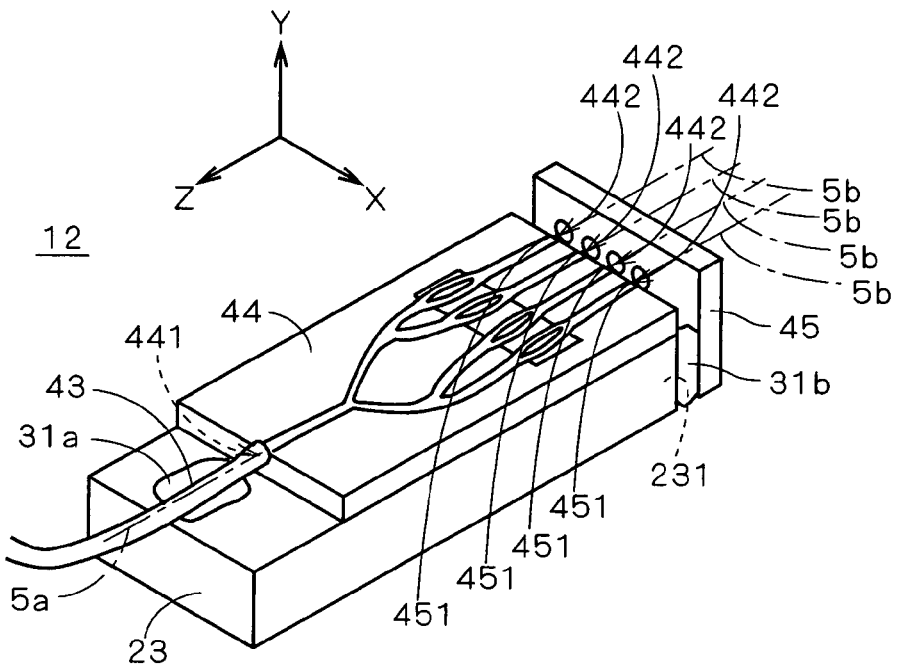
FIG. 14 is a perspective view showing another exemplary optical element module.

FIG. 14 is a perspective view showing another exemplary optical element module 12 manufactured by the optical element fixing apparatus 101. The optical element module 12 of FIG. 14 (such as a Mach-Zehnder type modulator) has an optical fiber 43, an optical waveguide element 44 formed of a dielectric material such as Lithium Niobate ($LiNbO_3$) (LN) or a semiconductor material such as gallium arsenide (GaAs), a microlens array 45 in which a plurality of lenses 451 are arranged and a base part 23, and a light beam is guided from the optical fiber 43 connected to an external light source (e.g., a semiconductor laser) to the optical waveguide element 44. The light beam is branched in the optical waveguide element 44 and the branched light beams are guided out to the lenses 451 included in the microlens array 45. Thus, modulated light beams are guided to a predetermined position.

Figure 15:
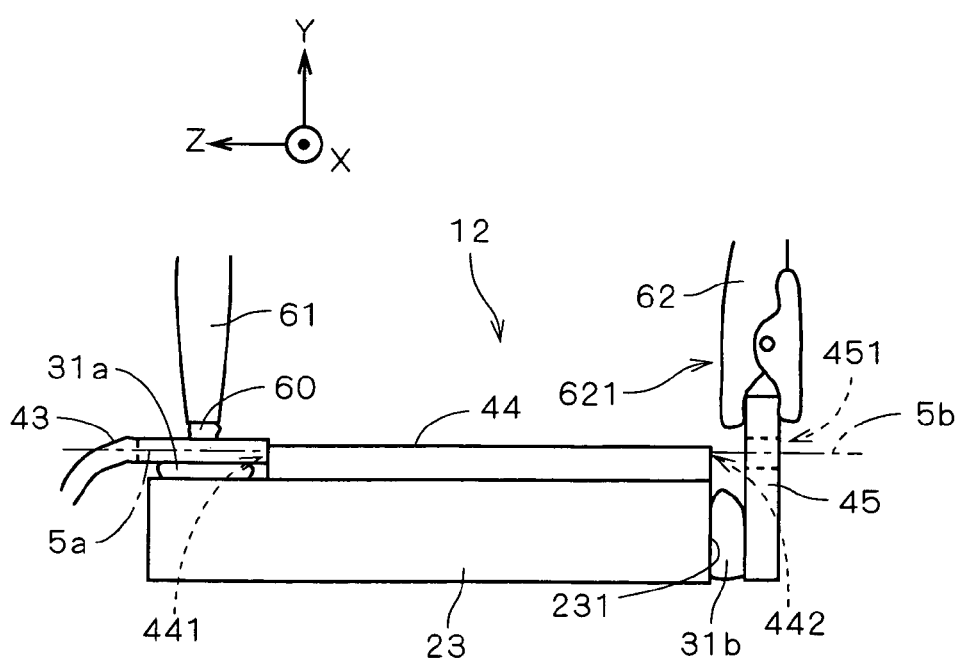
FIG. 15 is a view showing manufacture of the optical element module.

FIG. 15 is a view showing the optical element module 12 on the optical element fixing apparatus 101 as viewed from the (+X) side towards the (−X) direction, and only shows the optical element module 12 and the supporting arm 61 (or a supporting arm 62). The tip portion of the supporting arm 62 is a gripper 621. In manufacturing the optical element module 12, the supporting arm 61 and the supporting arm 62 are changed properly in accordance with the process in the optical element fixing apparatus 101, with the base part 23 held by the holding part 121, but FIG. 15 shows both supporting arms. In the optical element module 12, after the optical fiber 43 is positioned relatively to the optical waveguide element 44, the microlens array 45 is positioned. Detailed discussion will be made below on a manufacturing process and a structure of the optical element module 12 according to the flow of the manufacturing process in FIG. 9.

The optical waveguide element 44 has a plurality of optical waveguide outlets 442 for one optical waveguide inlet 441 and is fixed on the base part 23. This determines a reference optical axis 5a corresponding to the orientation of the optical waveguide inlet 441 of the optical waveguide element 44 with respect to the base part 23 (Step S11). Subsequently, the optical fiber 43 whose tip portion is metallized (or provided with a metal sleeve) is supported by the supporting arm 61 at another portion (for example, on an assisting member for the optical fiber 43) on the holding part 121 with the solder 60 interposed therebetween (Step S12).

Solder 31a is applied to the base part 23 on the side of the optical waveguide inlet 441 of the optical waveguide element 44 and the base part 23 is heated up to the melting point of the solder 31a (in other words, the holding part 121 is heated) to melt the solder 31a. Then, the optical fiber 43 is moved to the optical waveguide inlet 441 by the supporting arm 61 (Step S13).

In course of manufacture, light from a light source which is separately provided can be led to the optical fiber 43, and the light beam led to the optical fiber 43 is guided through the optical waveguide inlet 441 to the inside of the optical waveguide element 44 and the branched lights are guided out from a plurality of optical waveguide outlets 442, respectively. The lights guided out go through a dedicated lens system which is separately provided and are received by the image pickup part 7 (see FIG. 5), where an image of the lights is acquired (Step S14). The supporting arm 61 uses the arm moving mechanism 130 to move the optical fiber 43 in the X axis, Y axis and Z axis directions and rotate the optical fiber 43 around the $\alpha$ axis, the $\beta$ axis and the $\gamma$ axis on the basis of the brightness and distribution of lights represented by the acquired image, to position the tip portion of the optical fiber 43 so that the image representing the state of lights should be a predetermined state (in other words, the tip portion of the optical fiber 43 should go along the reference optical axis 5a) (Step S15). At this time, the solder 31a is interposed between the optical fiber 43 and the base part 23.

Subsequently, hardening of the solder 31a is started by stopping the heating of the base part 23 (Step S16) and positioning of the optical fiber 43 is repeated following the relative move of the reference optical axis 5a caused by cooling (Steps S17 to S19). When the hardening of the solder 31a is completed (Step S20), the supporting arm 61 is heated by the arm heater 161 to meld the solder 60 and removed from the optical fiber 43 (Step S21).

When the optical fiber 43 is fixed onto the base part 23, subsequently, the microlens array 45 is gripped with the gripper 621 of the supporting arm 62 at another portion on the holding part 121 (Step S12). Since a plurality of reference optical axes 5b serving as the reference for positioning of the microlens array 45 correspond to the orientations of a plurality of optical waveguide outlets 442 of the optical waveguide element 44, a plurality of reference optical axes 5b are determined at the time when the optical waveguide element 44 is fixed onto the base part 23 (which corresponds to Step S11).

Then, the solder 31b is applied to a side surface 231 of the base part 23 on the side of the optical waveguide outlets 442 (i.e., the (−Z) side) while the base part 23 is heated up to the melting point of the solder 31b, and the microlens array 45 is moved to the side surface 231 by the supporting arm 62 (Step S13). The interval of the lenses 451 in the microlens array 45 is equal to the interval of the optical waveguide outlets 442, and the microlens array 45 is held at such a position as the lenses 451 correspond to the optical waveguide outlets 442, respectively. A surface of the microlens array 45 which faces the base part 23 is metallized and solder whose melting point is lower than that of the solder 31a is used as the solder 31b.

A plurality of lights guided out from the optical waveguide outlets 442 of the optical waveguide element 44 towards the microlens array 45 are led to the image pickup part 7 through the lenses 451 (see FIG. 5) and images corresponding to the lights are acquired (Step S14). With control of the control part 151, the supporting arm 62 moves the microlens array 45 in the three directions orthogonal to one another and rotates the microlens array 45 around the three axes orthogonal to one another on the basis of the acquired images, and the microlens array 45 is positioned so that a plurality of lights guided out should be in an appropriate state along the reference optical axes 5b, respectively (Step S15). At this time, the solder 31b is interposed between the microlens array 45 and the base part 23. Then, the hardening of the solder 31b starts (Step S16) and the microlens array 45 is positioned following the relative move of the reference optical axes 5b (Steps S17 to S19). When the hardening of the solder 31b is completed (Step S20), the microlens array 45 is released from the gripping by the supporting arm 62 (Step S21).

Thus, in the optical element fixing apparatus 101, the optical fiber 43 and the microlens array 45 are fixed onto the base part 23 out of contact therewith, with the solder 31a and 31b interposed therebetween, while being positioned with respect to the reference optical axes 5a and 5b which are determined by the optical waveguide element 44, respectively, with high accuracy. As a result, with the optical element fixing apparatus 101, the optical element module 12 in which light is efficiently guided and branched lights are emitted in an appropriate direction can be easily manufactured and the structure of the optical element module 12 is simplified. The optical element module 12 corresponds to the optical element module 1a (FIG. 7A) in accordance with the first basic structure in terms of the relation between the base part 23 and the optical fiber 43 and corresponds to the optical element module 1b (FIG. 7B) in accordance with the second basic structure in terms of the relation between the optical waveguide element 44 and the microlens array 45 if the base part 23, the optical fiber 43 and the optical waveguide element 44 are regarded as a unit.

Figure 16:
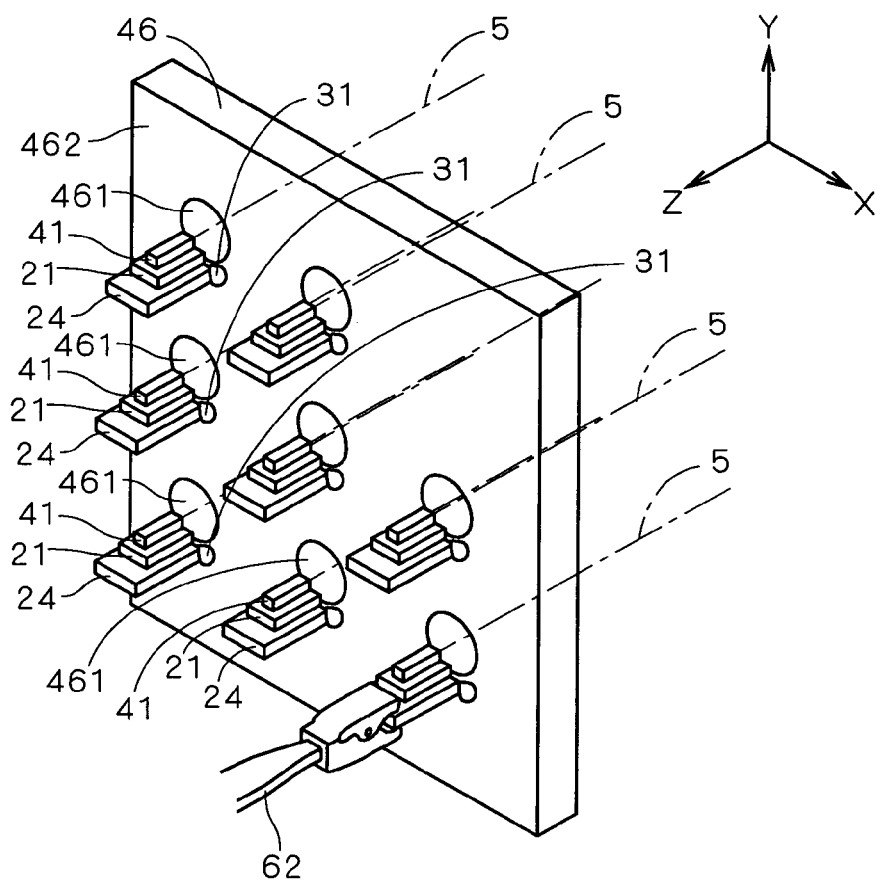
FIG. 16 is a view showing another exemplary manufacture of an optical element module.

FIG. 16 is a view showing still another exemplary optical element module 13 manufactured by the optical element fixing apparatus 101. In the optical element module 13 of FIG. 16, a plurality of semiconductor lasers 41 are fixed at positions corresponding to lenses 461 of a microlens array 46, respectively, to form a multichannel light source unit. In manufacturing the optical element module 13 of FIG. 16, a supporting arm whose tip portion is a gripper facing towards the (−Z) direction is used as the supporting arm 62 and the microlens array 46 is held by the holding part 121 at an upright posture.

Figure 17:
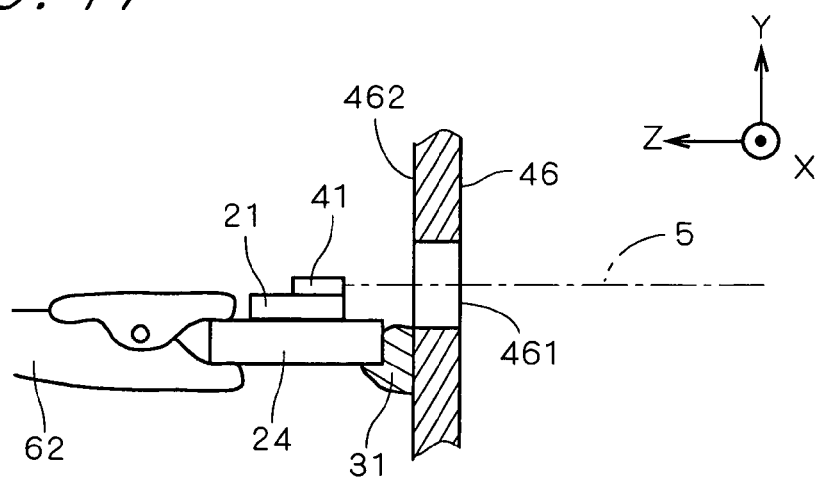
FIG. 17 is a view showing manufacture of the optical element module.

FIG. 17 is a longitudinal section of the optical element module 13 and shows only part of the optical element module 13. Discussion will be made below on a manufacturing process and a structure of the optical element module 13 according to the flow of FIG. 9.

In the optical element module 13, a plurality of reference optical axes 5 serving as the reference for the manufacture correspond to respective axes of the lenses 461 in the microlens array 46 (in other words, Step S11 of FIG. 9 is not needed). The semiconductor laser 41 is fixed onto the submount 21 and the submount 21 is fixed onto an auxiliary plate 24 in advance. Subsequently, the auxiliary plate 24 is gripped by the supporting arm 62 which is movable in the X axis, Y axis and Z axis directions and rotatable around the α axis, the β axis and the γ axis (Step S12). One surface 462 of the microlens array 46 is metallized and the semiconductor laser 41, together with the auxiliary plate 24, is moved to a position corresponding to one of the lenses 461 by the supporting arm 62 (Step S13).

The solder 31 is applied between the auxiliary plate 24 and the main surface 462 while the auxiliary plate 24 is heated by the arm heater 161 with the supporting arm 62 interposed therebetween up to the melting point of the solder 31. This makes a state shown in FIG. 17 where the solder 31 is interposed between the auxiliary plate 24 and the microlens array 46.

Like the semiconductor laser module 11, the semiconductor laser 41 is electrically connected to the semiconductor laser driving part and the semiconductor laser driving part controls the semiconductor laser 41 to emit a light beam. The light beam is led to the image pickup part 7 (see FIG. 5), where an image corresponding to the state of the light beam is acquired (Step S14).

With control of the control part 151, the supporting arm 62 moves and rotates the semiconductor laser 41 on the basis of the acquired image to position the semiconductor laser 41 with respect to the reference optical axis 5 (Step S15). At this time, the microlens array 46 and the auxiliary plate 24 are out of contact with each other and by stopping the heating of the auxiliary plate 24, hardening of the solder 31 starts (Step S16) and positioning of the semiconductor laser 41 is repeated following the relative move of the reference optical axis 5 (Steps S17 to S19). When the hardening of the solder 31 is completed (Step S20), the auxiliary plate 24 is released from the gripping by the supporting arm 62 (Step S21).

Steps S12 to S21 are repeated for a plurality of reference optical axis 5 and a plurality of semiconductor lasers 41 are fixed onto the microlens array 46.

Thus, in the optical element fixing apparatus 101, a plurality of semiconductor laser 41 are positioned with high accuracy with respect to a plurality of reference optical axes 5, respectively, which are determined by a plurality of lenses 461 in the microlens array 46 while being fixed onto the microlens array 46 out of contact therewith, with the solder 31 interposed therebetween. This makes it possible to easily manufacture the optical element module 13 which is a multichannel light source unit in the optical element fixing apparatus 101, and in the optical element module 13, it is possible to determine the direction of emitting light beams with high accuracy and simplify its structure. The optical element module 13, in which the microlens array 46 determines a plurality of reference optical axes 5 and serves as a base for supporting the semiconductor lasers 41, corresponds to the optical element module 1b of FIG. 7B in accordance with the second basic structure in terms of the relation between each lens of the microlens array 46 and the semiconductor laser 41.

Figure 18:
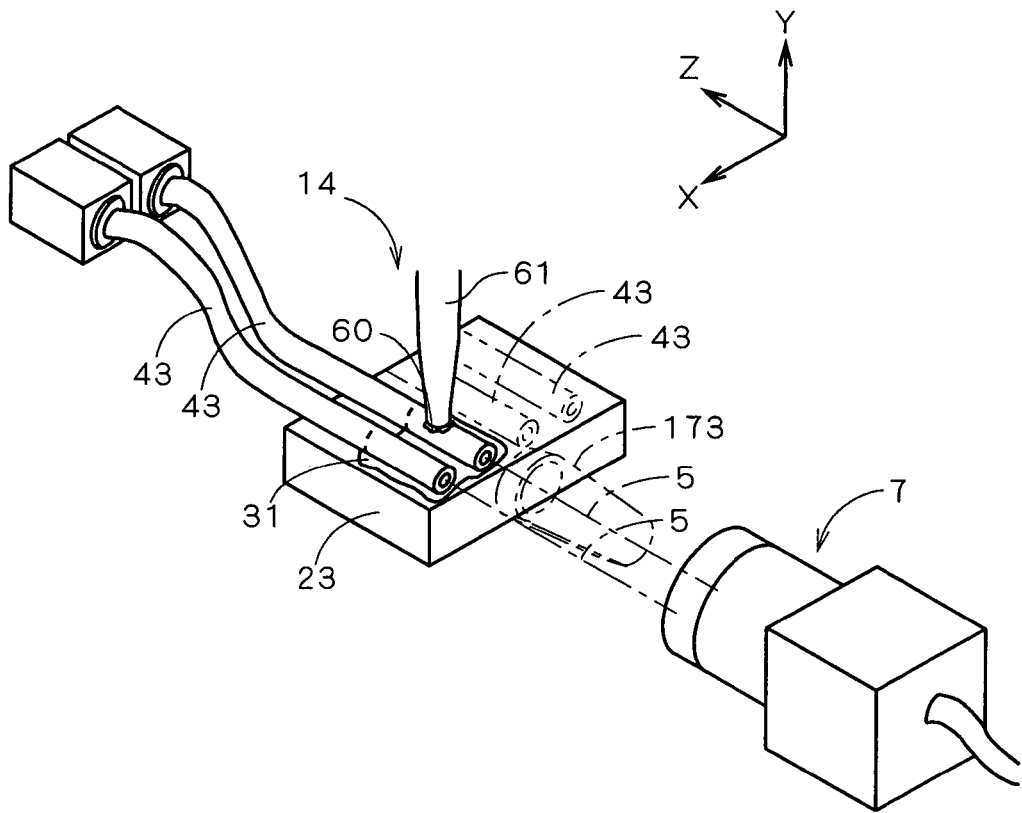
FIG. 18 is a view showing still another exemplary manufacture of an optical element module.

FIG. 18 is a view showing manufacture of yet another exemplary optical element module 14 in the optical element fixing apparatus 101. The optical element module 14 has a structure in which a plurality of optical fibers 43 connected to a semiconductor lasers for optical communications and the like are arranged on the base part 23 with high accuracy. Hereinafter, the optical element module 14 is referred to as a fiber array 14, and discussion will be made on the flow of manufacturing the fiber array 14 according to FIG. 9 and the characteristic features in structure of the fiber array 14, referring to FIG. 18.

First, the base part 23 is opposed to the image pickup part 7 (in other words, disposed on the holding part 121), and a plurality of reference optical axes 5 which are assumed relatively to the base part 23 are determined (Step S11). Subsequently, the optical fiber 43 whose tip portion is metallized (or provided with a metal sleeve at its tip portion) is supported by the supporting arm 61 with the solder 60 interposed therebetween (Step S12). The supporting arm 61 is movable in the X axis, Y axis and Z axis directions and rotatable around the α axis, the β axis and the γ axis and moves the optical fiber 43 to the neighborhood of a position corresponding to one of the reference optical axes 5 over the base part 23 (Step S13).

Figure 19:
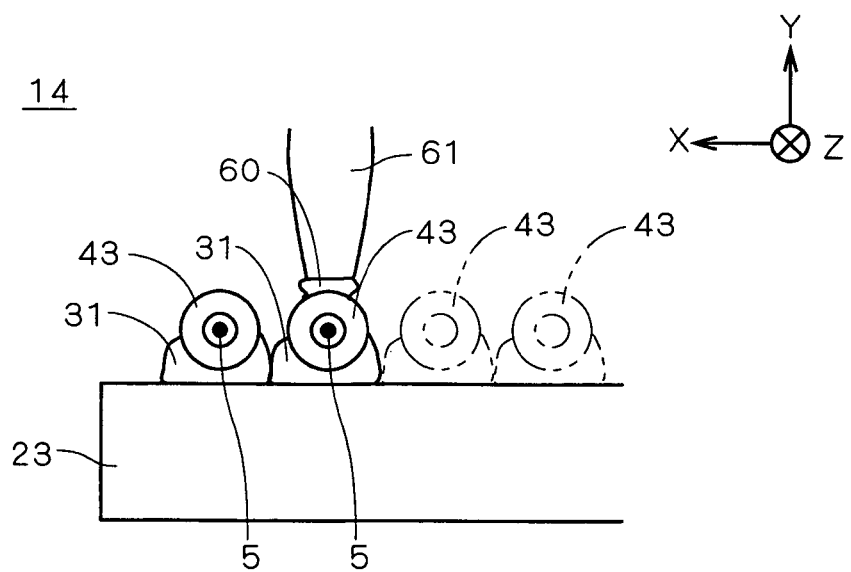
FIG. 19 is a view showing manufacture of the optical element module.

FIG. 19 is a view showing the fiber array 14 in course of manufacture as viewed from the (−Z) side towards the (+Z) direction. As shown in FIG. 19, the solder 31 is applied to the base part 23 and the base part 23 is heated up to the melting point of the solder 31 (in other words, the holding part heater 124 heats the holding part 121) to melt the solder 31, to make a state where the solder 31 is interposed between the optical fiber 43 and the base part 23. At this time, a light beam is emitted from a core of the optical fiber 43 and the supporting arm 61 moves on the basis of an image acquired by the image pickup part 7, to position the optical fiber 43 with respect to the base part 23 (specifically, so that the central axis of the optical fiber 43 should be the reference optical axis 5) (Steps S14 and S15).

At this time, like the semiconductor laser module 11, by disposing the switching lens 173 on the optical path, the position of the core of the optical fiber 43 is confirmed and the optical fiber 43 is arranged correspondingly to the reference optical axis 5. Then, the directivity of the light beam is confirmed by switching from the switching lens 173 to another lens separately provided. Subsequently, the heating of the base part 22 is stopped to start the hardening of the solder 31 (Step S16). While the image pickup part 7 checks an image of the light beam, positioning of the optical fiber 43 is repeated following the relative move of the reference optical axis 5 (Steps S17 to S19).

When the hardening of the solder 31a is completed (Step S20), the supporting arm 61 is heated and removed from the optical fiber 43 (Step S21). By repeating Steps S12 to S21, the next optical fiber 43 is positioned with respect to the next reference optical axis 5. Thus, a plurality of optical fibers 43 on the base part 23 are arranged with high accuracy. Since it is known from experiences that the solder 31 which is once melted and hardened is melted again only when heated up to a temperature higher than the temperature at which the solder 31 is melted immediately before, by controlling the temperature for heating the base part 23, it is possible to fix a plurality of optical fibers 43 onto the base part 23.

In Step S18 discussed above, the move of the reference optical axis 5 may be sensed on the basis of the light from the optical fiber 43 which is already fixed or may be sensed by a sensor which is separately provided.

Thus, in the optical element fixing apparatus 101, a plurality of optical fibers 43 can be positioned with high accuracy with respect to a plurality of reference optical axes 5 which are fixed relatively to the base part 23 while being fixed onto the base part 23 out of contact therewith, with the solder 31 interposed therebetween. This makes it possible to simplify the structure of the fiber array 14 which can emit a plurality of light beams with excellent directivity (in other words, a plurality of light beams whose emission angles are appropriately controlled) and it is thereby possible to reduce the manufacturing cost. The structure of each optical fiber 43 and the base part 23 corresponds to the optical element module 1a in accordance with the first basic structure.

In the optical element fixing apparatus 101, glass powder may be used, instead of the solder 31, as a bonding agent for fixing the optical element, and in this case, the optical element (such as the collimator lens 42) positioned with respect to the reference optical axis 5 is fixed onto the base part out of contact therewith, with the glass powder interposed therebetween. The optical element fixing apparatus 101 can thereby manufacture the optical element module in which the optical element is fixed with the glass powder while being positioned with high accuracy.

Figure 20:
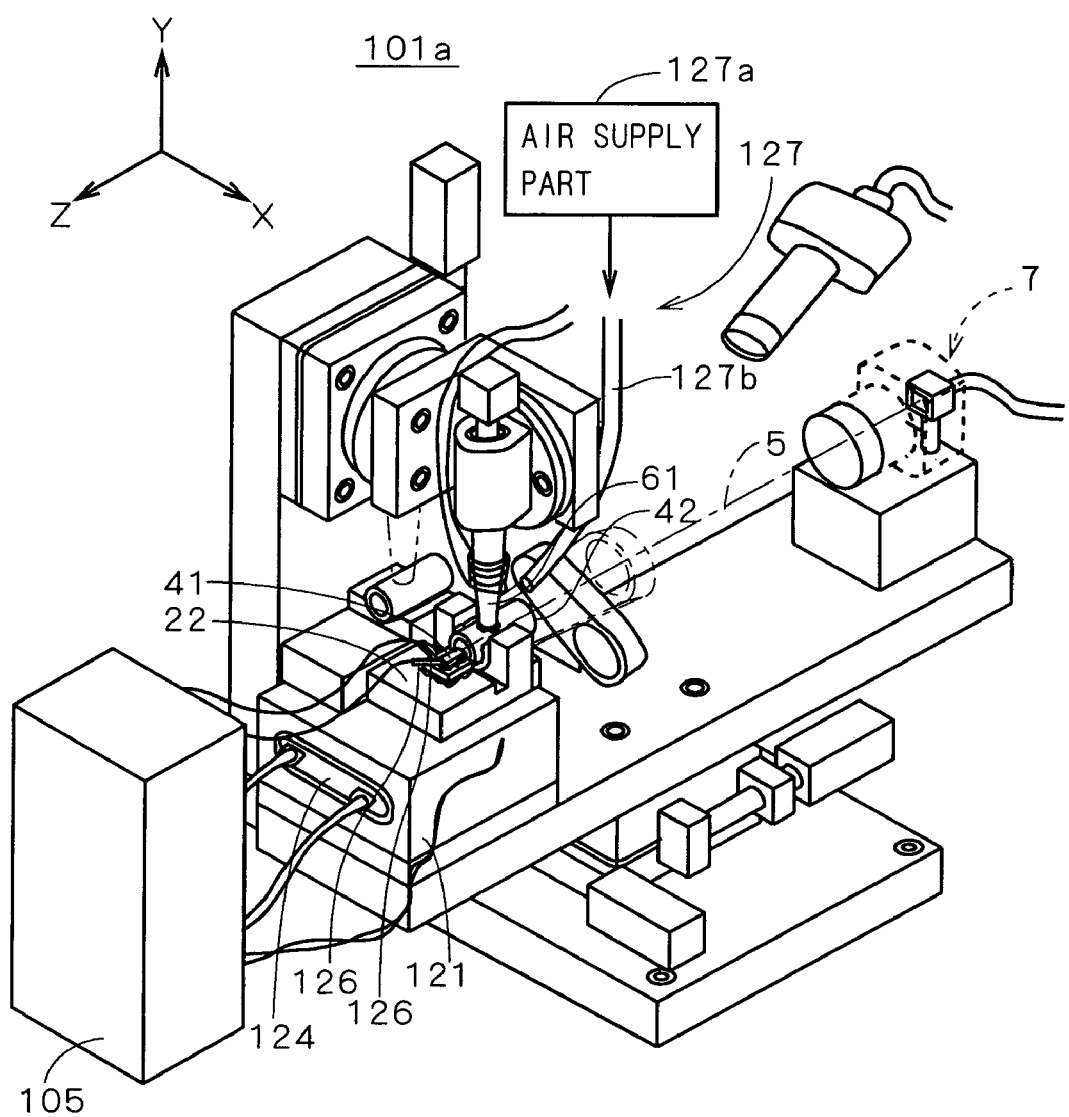
FIG. 20 is a perspective view showing an optical element fixing apparatus in accordance with a second preferred embodiment.

FIG. 20 is a perspective view showing an optical element fixing apparatus 101a in accordance with the second preferred embodiment. In the optical element fixing apparatus 101a of FIG. 20, a cooling part 127 having an air nozzle 127b connected to an air supply part 127a is provided and the cooling part 127 applies air (or nitrogen gas) towards the holding part 121. Other constituent elements in the optical element fixing apparatus 101a are the same as those in the optical element fixing apparatus 101 in accordance with first preferred embodiment and represented by the same reference signs.

The optical element fixing apparatus 101a of FIG. 20 is different from the optical element fixing apparatus 101 of FIG. 5 in method of hardening the solder 31. Specifically, when the solder 31 is hardened in Step S16 of FIG. 9, the cooling part 127 applies air towards the holding part 121. In other words, in hardening the solder 31, the heating by the holding part heater 124 is stopped while the cooling part 127 performs forced cooling. It is thereby possible to harden the solder 31 in a shorter time in the optical element fixing apparatus 101a. The method of positioning the optical element (such as the collimator lens 42) following the relative move of the reference optical axis 5 in Steps S17 to S20 is the same as that in the first preferred embodiment.

As another example of hardening the solder 31 in the optical element fixing apparatus 101a, there may be a case where the holding part 121 is always heated by the holding part heater 124 and the cooling part 127 applies air one after another. In the case of the semiconductor laser module 11, for example, first, the base part 22 on which the semiconductor laser 41 is fixed is disposed on the holding part 121 whose temperature is kept at the melting temperature of the solder 31 by the holding part heater 124 and then the solder 31 is melted (in other words, Step S13 is partly performed). The semiconductor laser 41 is electrically connected through the probe pin 126 and the collimator lens 42 is supported (may be supported in advance) by the supporting arm 61 which is movable in the X axis, Y axis and Z axis directions and rotatable around the α axis, the β axis and the γ axis (Step S12) and moved to the groove 222 having the melted solder 31 (see FIG. 8) (Step S13). Then, like in the first preferred embodiment, the image pickup part 7 acquires an image and the collimator lens 42 is quickly positioned on the basis of the image (Steps S14 and S15).

Subsequently, the cooling part 127 applies air to the holding part 121 which is being heated. At this time, the cooling part 127 cools only the neighborhood of the upper surface of the holding part 121 which includes the base part 22, to lower the temperature thereof. The positioning of the collimator lens 42 is repeated following the relative move of the reference optical axis 5 caused by the temperature fall and then the hardening of the solder 31 is completed, to fix the collimator lens 42 (Steps S16 to S20). The supporting arm 61 is removed from the collimator lens 42 while being heated (Step S21) and the semiconductor laser module 11 whose temperature is kept at the hardening temperature of the solder 31 or lower is removed from the holding part 121. The application of air from the cooling part 127 is stopped and the temperature in the neighborhood of the upper surface of the holding part 121 is quickly heated up to the melting temperature of the solder 31. Thus, in the method of manufacturing the optical element module in accordance with another example of the optical element fixing apparatus 101a, since the temperature profile (i.e., temperature change with time) of the base part 22 is made equal to that in the first preferred embodiment while the holding part 121 is always heated, it is possible to appropriately manufacture the optical element module (such as the optical element modules 11 to 14).

Thus, in the optical element fixing apparatus 101*a* of the second preferred embodiment, the holding part heater 124 and the cooling part 127 control the temperature of the holding part 121. This allows quick melting or hardening of the solder 31 in the optical element fixing apparatus 101*a* and it is thereby possible to appropriately manufacture the optical element module in which the optical element is positioned with high accuracy.

Figure 21:
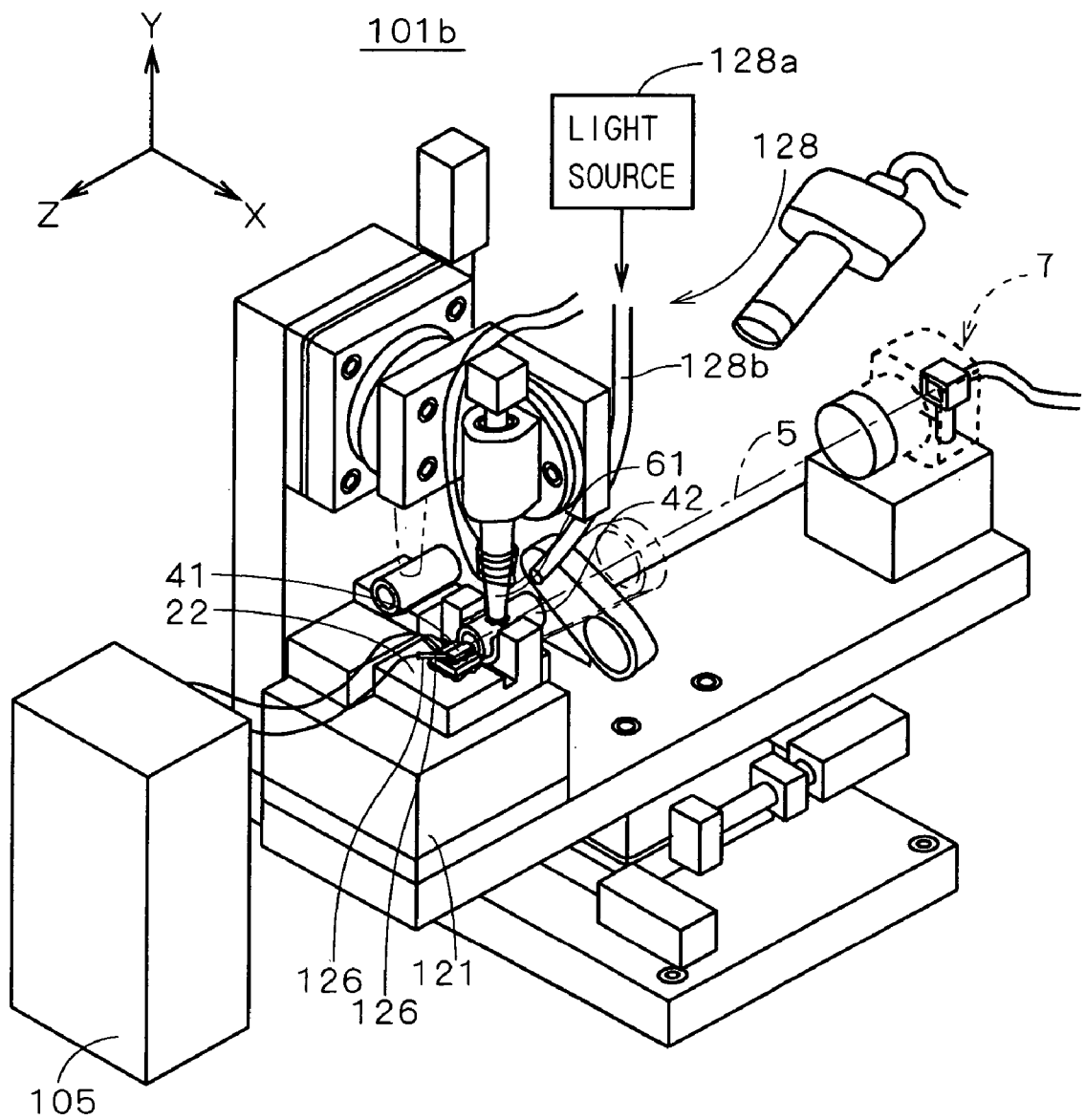
FIG. 21 is a perspective view showing an optical element fixing apparatus in accordance with a third preferred embodiment.

FIG. 21 is a perspective view showing an optical element fixing apparatus 101*b* in accordance with the third preferred embodiment. The optical element fixing apparatus 101*b* is different from the optical element fixing apparatus 101 of FIG. 5 in that the holding part heater 124 and the temperature sensor 125 are not provided and instead a light emitting part 128 is provided. The light emitting part 128 has an optical fiber 128*b* connected to a light source 128*a* and emits light (e.g., a ultraviolet ray) towards the optical element module on the holding part 121. Other constituent elements in the optical element fixing apparatus 101*b* are the same as those in the optical element fixing apparatus 101 in accordance with first preferred embodiment and represented by the same reference signs.

In the optical element fixing apparatus 101*b*, a bonding agent containing an UV curing resin as an agent for bonding (i.e., fixing) the optical element. Discussion will be made below on an exemplary case of manufacturing the semiconductor laser module 11, referring to FIG. 8 (herein, the solder 31 of FIG. 8 is referred to as a bonding agent). Like in the first preferred embodiment, when the collimator lens 42 supported by the supporting arm 61 which can move relatively to the holding part 121 along the three motion axes orthogonal to one another and rotate relatively to the holding part 121 around the three rotation axes orthogonal to one another is moved to the groove 222 of the base part 22 and positioned with respect to the reference optical axis 5 on the basis of an output from the image pickup part 7 (Steps S11 to S15), the bonding agent (which corresponds to the reference numero 31 in FIG. 8) is applied to the groove 222 and a ultraviolet ray is emitted from the light emitting part 128 towards the neighborhood of the groove 222. This starts hardening the bonding agent (Step S16), and positioning of the collimator lens 42 is repeated following the relative move of the reference optical axis 5 caused by shrinkage of the bonding agent while the relative move of the reference optical axis 5 is checked with an image acquired by the image pickup part 7 until the hardening of the bonding agent is completed (e.g., for several tens seconds) (Steps S17 to S19).

When it is confirmed that the relative move of the reference optical axis 5 is stopped (in other words, it is confirmed that the hardening of the bonding agent is completed) (Step S20), the supporting arm 61 is heated to be removed from the collimator lens 42 and the semiconductor laser module 11 is removed from the holding part 121. By this method, other optical element modules (such as the optical element modules 12 to 14) may be manufactured in the optical element fixing apparatus 101*b*.

Thus, in the optical element fixing apparatus 101*b* of the third preferred embodiment, since the light emitting part 128 is provided, it is possible to appropriately manufacture the optical element module in which the optical element is positioned with high accuracy while the bonding agent between the optical element and the base part is hardened.

The resin component contained in the bonding agent is not limited to the UV curing resin but may be, for example, a thermosetting resin. In such a case, the bonding agent may be hardened by the holding part heater 124 like in the first preferred embodiment.

Though the preferred embodiments of the present invention have been discussed above, the present invention is not limited to the above-discussed preferred embodiments, but allows various variations.

The supporting arm is not limited to those of the above-discussed preferred embodiments but may be a collet which supports the optical element by vacuum adsorption. In a case where the collet is used, the optical element gets supported or removed by ON/OFF of the vacuum. In the supporting arm which supports the optical element with solder interposed therebetween, a bonding agent may be used instead of the solder, and in such a case, the supporting arm and the optical element may be removed by rotation of the supporting arm.

In the optical element fixing apparatus, a bonding agent supply part for supplying the bonding agent (including solder) may be provided to supply the bonding agent to the base part on the basis of control of the control part 151.

The light emitted through the optical element supported by the supporting arm 61 or the optical element fixed onto the base part may not be necessarily received by the image pickup part 7. In a case, for example, where the optical element is positioned on the basis of only the directivity of the light, the light may be received by a PSD element or the like which senses the position of the received light.

There may be case where a light source for emitting a light beam is provided in the optical element fixing apparatus and the optical element is positioned with the light beam as a reference optical axis.

In the optical element fixing apparatus, the optical element may be positioned so that light guided out from the optical element should be in a desired state (for example, in a state after being subjected to collimating adjustment) as well as positioned with respect to the reference optical axis in any optical element module. Specifically, in a case where the optical element module is constituted of a plurality of optical elements to be fixed and the optical element near the image pickup part 7 (i.e., a front optical element in a traveling direction of light) is a lens, the front optical element and the image pickup device 172 of the image pickup part 7 are optically conjugate to each other in a state where the switching lens is disposed between the front optical element and the image pickup part 7, and any one of the optical elements may be positioned.

The optical element included in the optical element module is not limited to a collimator lens, a lens included in a microlens array, an optical fiber, a semiconductor laser or an optical waveguide element but other optical elements (e.g., a microscopic optical element requiring positioning accuracy of several tens nm to several μm) may be adopted. The optical element fixing apparatus can position even the microscopic optical element with high accuracy. The optical element which determines the reference optical axis 5 may be an optical element other than the semiconductor laser, the optical waveguide element or the lens included in the microlens array, and for example, as an optical element for emitting light, a semiconductor light emitting element, such as a light emitting diode, which is different in type from the semiconductor laser, may be adopted.

In the optical element module having a plurality of optical elements to be positioned, the manner in which the optical elements are arranged is not limited to those of the preferred embodiments. Since the positions and orientations of the optical elements can be freely determined (in other words, adjustment can be made with high degree of freedom) in the optical element fixing apparatus, high-accuracy optical axis adjustment can be made while the optical elements are arranged in a complicate manner.

While the invention has been shown and described in detail, the foregoing description is in all aspects illustrative and not restrictive. It is therefore understood that numerous modifications and variations can be devised without departing from the scope of the invention.

What is claimed is:

1. An apparatus for fixing an optical element onto a base part, comprising:
   a holding part for holding a base part to which a bonding agent for fixing a first optical element is applied;
   a supporting part which supports said first optical element while moving the same to said base part and is removed from said first optical element after fixing;
   a light receiving part for receiving a reference light emitted from said first optical element or a second optical element attached onto said base part;
   a moving mechanism for moving or rotating said supporting part relatively to said holding part;
   a control part for positioning said first optical element at a position with respect to said second optical element on the basis of an output from said light receiving part; and
   a switching lens which is movable to and fro on an optical path, between said light receiving part and a front optical element that is one of said first and second optical elements which is closer to said light receiving part,
   wherein said front optical element is a lens, and said front optical element and a light receiving surface in said light receiving part are optically conjugate to each other in a state where said switching lens is disposed on said optical path.

2. The apparatus according to claim 1, wherein
   a position of said first optical element is checked and said first optical element is positioned, repeatedly, in course of hardening of said bonding agent.

3. The apparatus according to claim 1, wherein
   said first optical element is a collimator lens.

4. The apparatus according to claim 3, wherein
   said second optical element is a semiconductor light emitting element for emitting light towards said collimator lens.

5. The apparatus according to claim 1, wherein
   said first optical element is a microlens array.

6. The apparatus according to claim 5, wherein
   said second optical element is an optical waveguide element for emitting light towards said microlens array.

7. The apparatus according to claim 5, wherein
   said second optical element is a semiconductor light emitting element for emitting light towards said microlens array.

8. The apparatus according to claim 1, wherein
   said first optical element is an optical fiber.

9. The apparatus according to claim 1, wherein
   said moving mechanism moves or rotates said supporting part relatively to said holding part with respect to at least three axes.

10. The apparatus according to claim 9, wherein
    said moving mechanism moves said supporting part relatively to said holding part along three motion axes and rotates said supporting part relatively to said holding part around three rotation axes.

11. The apparatus according to claim 9, wherein
    said first optical element is one selected out of a group consisting of a semiconductor light emitting element, a collimator lens, a microlens array and an optical fiber.

12. The apparatus according to claim 9, further comprising
    a temperature control part for controlling temperature of said supporting part,
    wherein said supporting part supports said first optical element with solder interposed therebetween.

13. The apparatus according to claim 9, wherein
    said bonding agent is a bonding agent containing resin component, and
    said apparatus further comprising
    a mechanism for hardening said bonding agent on said base part.

14. The apparatus according to claim 9, wherein
    said bonding agent is glass powder or solder, and
    said apparatus further comprising
    another temperature control part for controlling temperature of said holding part.

15. An apparatus for fixing an optical element onto a base part, comprising:
    a holding part for holding a base part to which a bonding agent for fixing an optical element is applied;
    a supporting part which supports said optical element while moving the same to said base part and is removed from said optical element after fixing;
    a light receiving part for receiving a reference light emitted from said optical element;
    a moving mechanism for moving or rotating said supporting part relatively to said holding part;
    a control part for positioning said optical element at a position with respect to said base part on the basis of an output from said light receiving part; and
    a switching lens which is movable to and fro on an optical path, between said light receiving part and said optical element,
    wherein said optical element is a lens, and said optical element and a light receiving surface in said light receiving part are optically conjugate to each other in a state where said switching lens is disposed on said optical path.

16. An apparatus for fixing an optical element onto a base part, comprising:
    a holding part for holding a base part to which a bonding agent for fixing a first optical element is applied;
    a supporting part which supports said first optical element while moving the same to said base part and is removed from said first optical element after fixing;
    a light receiving part for receiving a reference light emitted from said first optical element or a second optical element attached onto said base part;
    a moving mechanism for moving or rotating said supporting part relatively to said holding part;
    a position control part for positioning said first optical element at a position with respect to said second optical element on the basis of an output from said light receiving part; and
    a temperature control part for controlling temperature of said supporting part,
    wherein said supporting part supports said first optical element with first solder interposed therebetween, said bonding agent is second solder, and melting point of said second solder is lower than that of said first solder.

17. An apparatus for fixing an optical element onto a base part, comprising:
- a holding part for holding a base part to which a bonding agent for fixing an optical element is applied;
- a supporting part which supports said optical element while moving the same to said base part and is removed from said optical element after fixing;
- a light receiving part for receiving a reference light emitted from said optical element;
- a moving mechanism for moving or rotating said supporting part relatively to said holding part;
- a position control part for positioning said optical element at a position with respect to said base part on the basis of an output from said light receiving part; and
- a temperature control part for controlling temperature of said supporting part,
- wherein said supporting part supports said optical element with first solder interposed therebetween, said bonding agent is second solder, and melting point of said second solder is lower than that of said first solder.

* * * * *